US009116335B2

(12) United States Patent
Kimura

(10) Patent No.: US 9,116,335 B2
(45) Date of Patent: Aug. 25, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Kohei Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/275,685

(22) Filed: May 12, 2014

(65) Prior Publication Data

US 2014/0340544 A1 Nov. 20, 2014

(30) Foreign Application Priority Data

May 14, 2013 (JP) ................. 2013-102582

(51) Int. Cl.
*G02B 15/16* (2006.01)
*G02B 13/00* (2006.01)

(52) U.S. Cl.
CPC .............. *G02B 15/16* (2013.01); *G02B 13/009* (2013.01)

(58) Field of Classification Search
CPC .... G02B 15/16; G02B 13/004; G02B 13/009; G02B 9/34
See application file for complete search history.

(56) References Cited

U.S. PATENT DOCUMENTS 6,016,228 A * 1/2000 Uzawa .......................... 359/687

FOREIGN PATENT DOCUMENTS

JP 2006-171615 A 6/2006
JP 2010-102096 A 5/2010

* cited by examiner

*Primary Examiner* — Joseph P Martinez

(74) *Attorney, Agent, or Firm* — Canon USA Inc. IP Division

(57) ABSTRACT

A zoom lens includes, in order from an object side to an image side thereof, a first lens unit having a positive refractive power, a second lens unit having a negative refractive power, a third lens unit having a positive refractive power, and a rear lens group including one or more lens units. A distance between adjacent ones of the lens units changes during zooming. The second lens unit and the third lens unit each include a resin lens element. A focal length f2p of the resin lens element included in the second lens unit, a focal length f3p of the resin lens element included in the third lens unit, and a focal length ft of the zoom lens at a telephoto end are set to satisfy predetermined mathematical conditions.

16 Claims, 15 Drawing Sheets

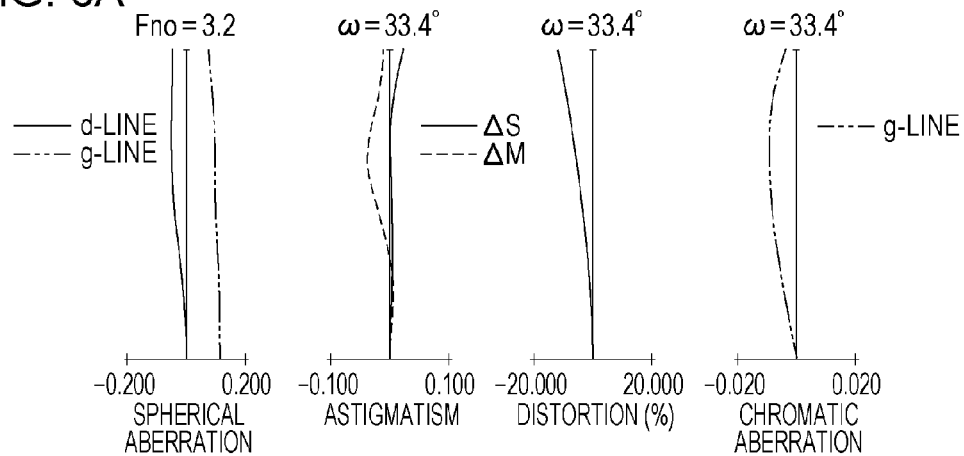
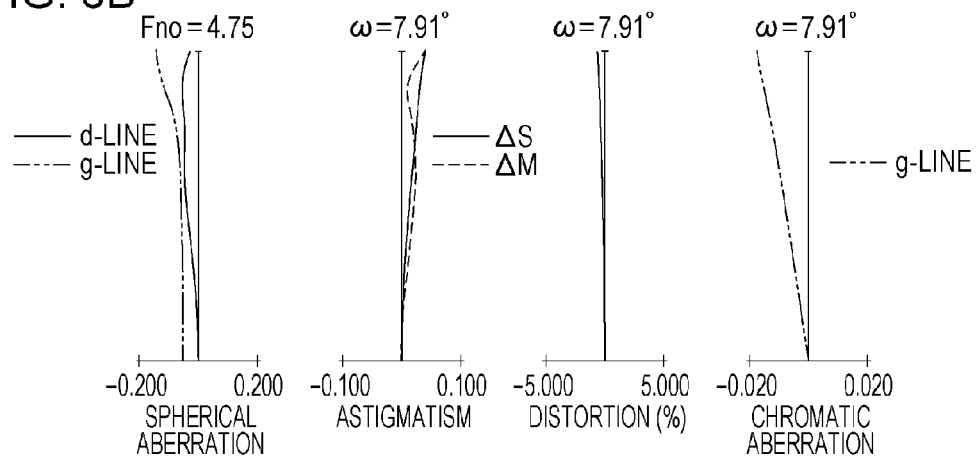
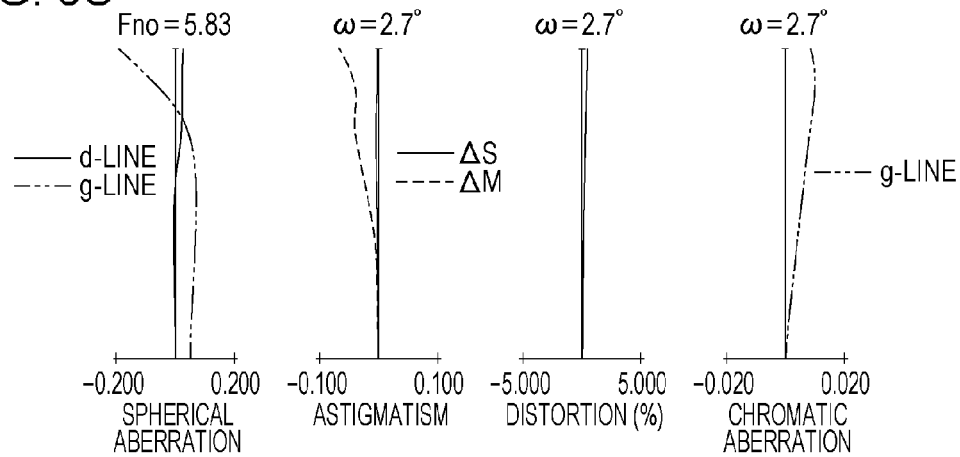

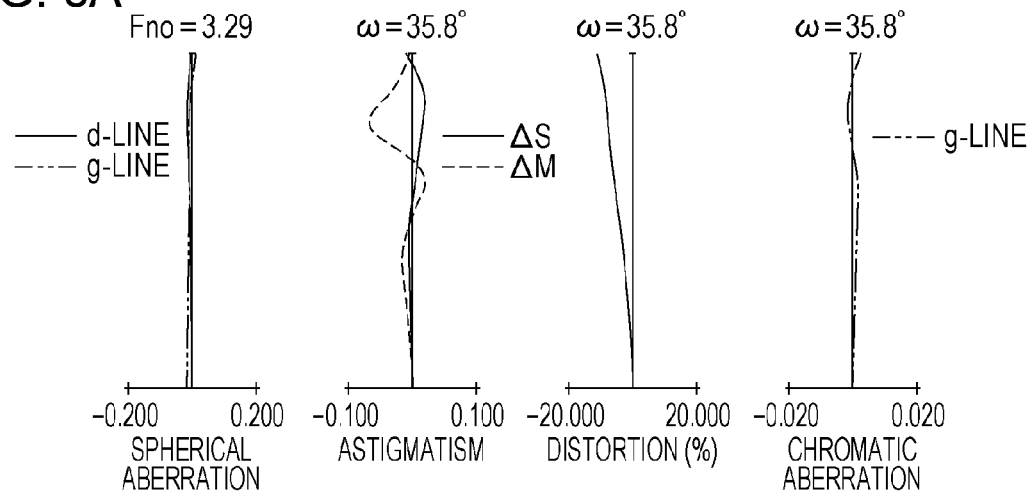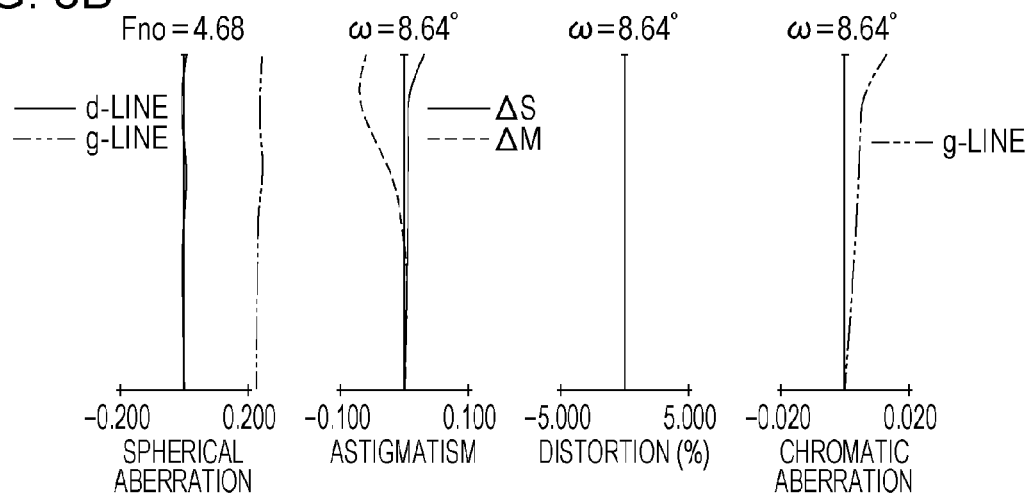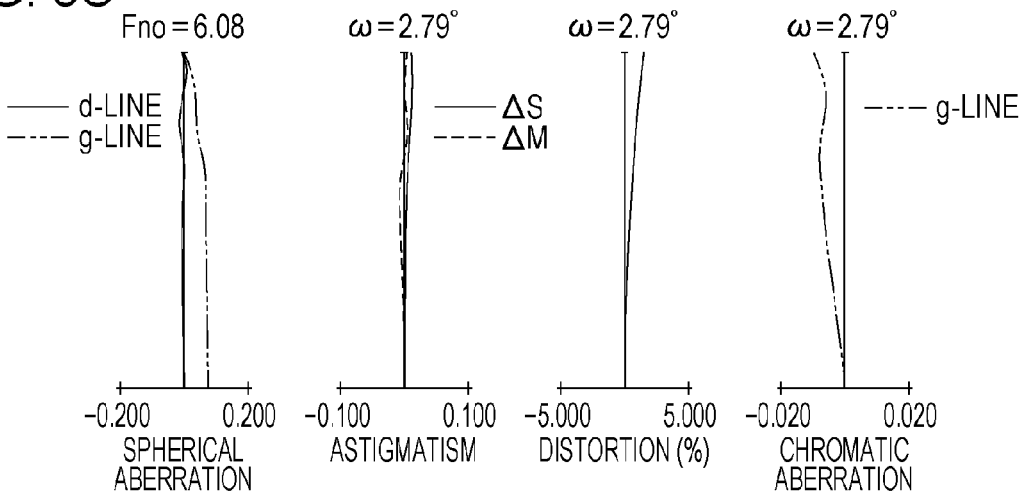

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same and is suitable for, for example, image pickup apparatuses including image pickup devices, such as a digital still camera, a video camera, a monitoring camera, and a broadcast camera, or image pickup apparatuses such as a silver-halide-film camera.

2. Description of the Related Art

Recent image pickup apparatuses including solid-state image pickup devices, such as a digital still camera and a video camera, have improved functions while the total sizes thereof are small. Zoom lenses intended for such apparatuses are desired to have short total lens lengths and high zoom ratios. Moreover, the zoom lenses are desired to be lightweight and to cost low.

A positive-lead zoom lens is an exemplary zoom lens having a short total lens length and a high zoom ratio and includes, in order from an object side to an image side thereof, a first lens unit having a positive refractive power, a second lens unit having a negative refractive power, a third lens unit having a positive refractive power, and a rear lens group including one or more lens units. Another exemplary zoom lens includes lens elements that are made of materials other than glass, such as resin materials, so that the weight and the cost of the zoom lens are reduced.

A positive-lead zoom lens is disclosed by Japanese Patent Laid-Open No. 2010-102096 in which a second lens unit includes a resin lens element having an aspherical surface and provided at the extreme end of the second lens unit on the image side. Another zoom lens is disclosed by Japanese Patent Laid-Open No. 2006-171615 in which a second lens unit includes one resin lens element having a positive refractive power and one resin lens element having a negative refractive power, and a fourth lens unit includes one resin lens element having a positive refractive power and one resin lens element having a negative refractive power.

In general, the variation in the refractive index of a resin lens element due to changes in the temperature is greater than that of a glass lens element. The effect caused by the variation in the shape of the resin lens element due to expansion or contraction is also greater than that of the glass lens element. Hence, variations in the focus, spherical aberration, and the like due to changes in the temperature are significant, leading to possible deterioration of optical performance. In a positive-lead zoom lens including a relatively small number of lens elements, the refractive power on each of lens surfaces is high. Therefore, the deterioration of optical performance due to changes in the temperature appears clearly at every zooming position.

To obtain a small-size, high-zoom-ratio zoom lens that includes resin lens elements and exhibits high optical performance at every zooming position, it is important to provide resin lens elements in a plurality of lens units and to appropriately set the refractive powers of the lens elements and the positions of the resin lens elements.

SUMMARY OF THE INVENTION

According to an aspect of the present invention, a zoom lens includes, in order from an object side to an image side thereof, a first lens unit having a positive refractive power, a second lens unit having a negative refractive power, a third lens unit having a positive refractive power, and a rear lens group including one or more lens units. A distance between adjacent ones of the lens units changes during zooming. The second lens unit and the third lens unit each include a resin lens element. The following conditional expressions are satisfied:

$$0.10 < |f3p/ft| < 0.23$$

$$-2.40 < f2p/f3p < -0.34$$

where f2p denotes a focal length of the resin lens element included in the second lens unit, f3p denotes a focal length of the resin lens element included in the third lens unit, and ft denotes a focal length of the zoom lens at a telephoto end.

Further features of the present invention will become apparent from the following description of exemplary embodiments with reference to the attached drawings.

BRIEF DESCRIPTION OF THE DRAWINGS

FIGS. 6A, 6B, and 6C are aberration charts of the zoom lens at the wide-angle end, at an intermediate zooming position, and at a telephoto end, respectively, according to the third embodiment;

FIGS. 8A, 8B, and 8C are aberration charts of the zoom lens at the wide-angle end, at an intermediate zooming position, and at a telephoto end, respectively, according to the fourth embodiment;

DESCRIPTION OF THE EMBODIMENTS

Zoom lenses according to different embodiments of the present invention and an image pickup apparatus including any of the zoom lenses will now be described in detail with reference to the attached drawings. The zoom lenses according to the following embodiments of the present invention each include, in order from an object side to an image side thereof, a first lens unit having a positive refractive power, a second lens unit having a negative refractive power, a third lens unit having a positive refractive power, and a rear lens group including one or more lens units.

Figure 1:
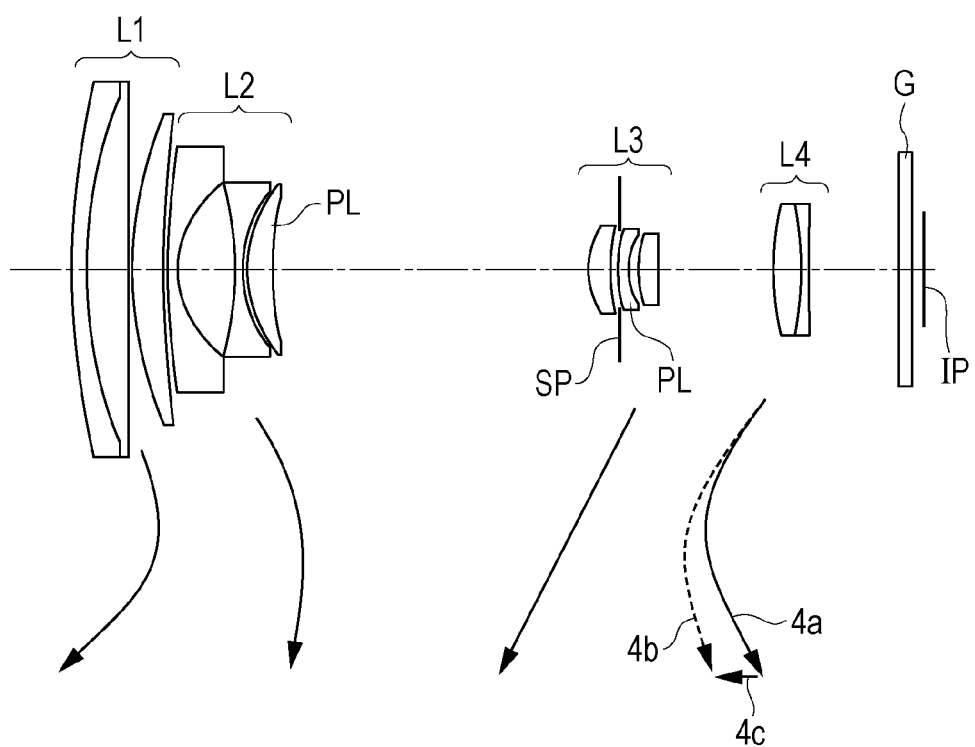
FIG. 1 is a sectional view of a zoom lens at a wide-angle end, according to a first embodiment.
Figure 2A:
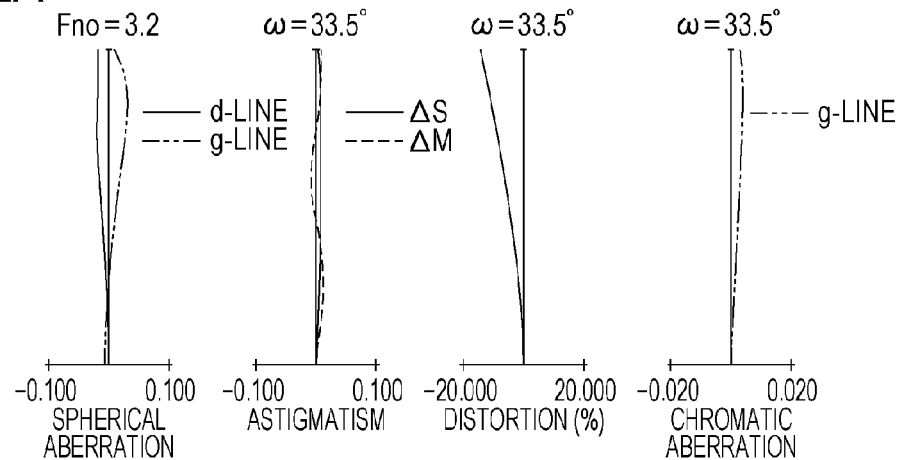
FIGS. 2A, 2B, and 2C are aberration charts of the zoom lens at the wide-angle end, at an intermediate zooming position, and at a telephoto end, respectively, according to the first embodiment.
Figure 2B:
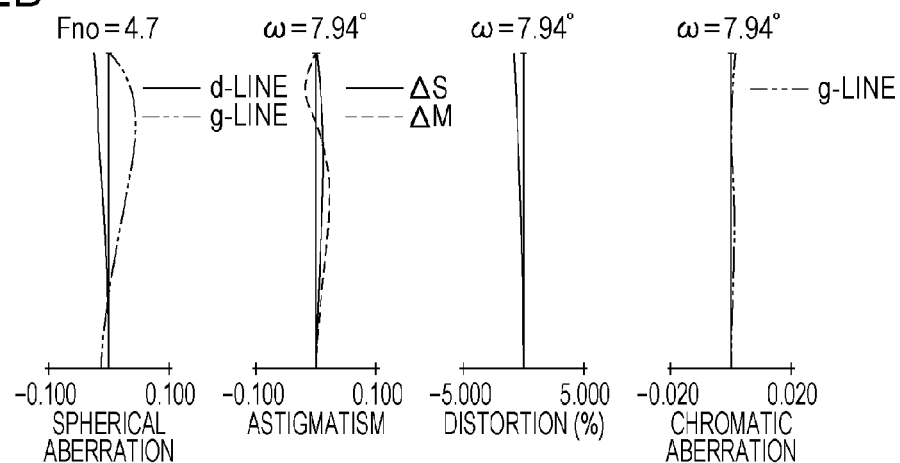
Figure 2C:
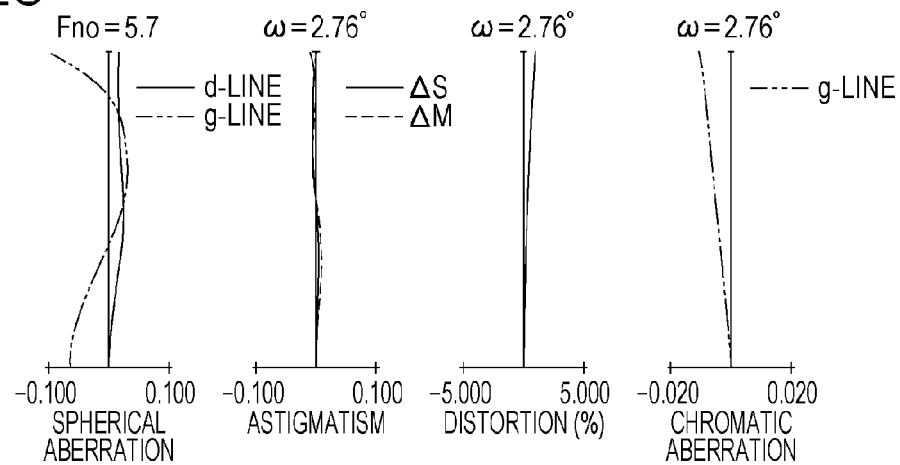
Figure 3:
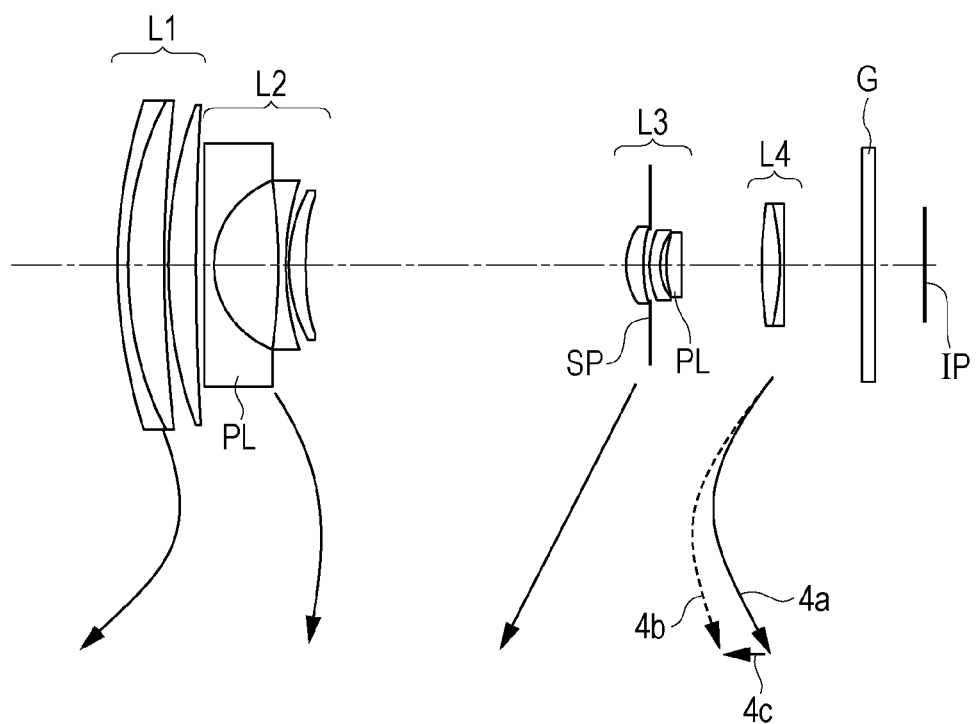
FIG. 3 is a sectional view of a zoom lens at a wide-angle end, according to a second embodiment.
Figure 4A:
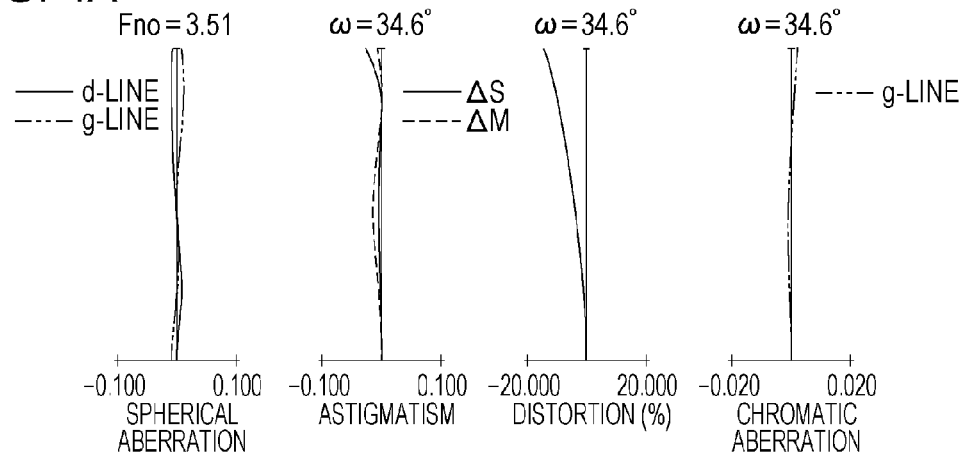
FIGS. 4A, 4B, and 4C are aberration charts of the zoom lens at the wide-angle end, at an intermediate zooming position, and at a telephoto end, respectively, according to the second embodiment.
Figure 4B:
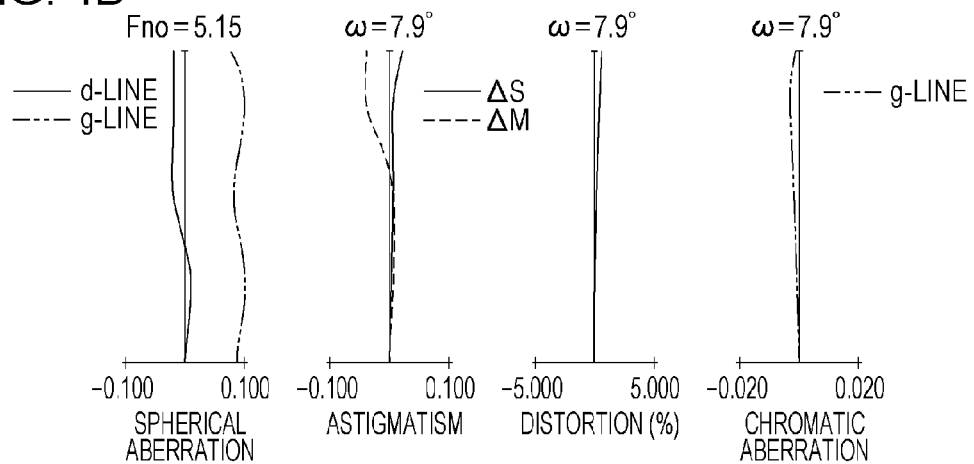
Figure 4C:
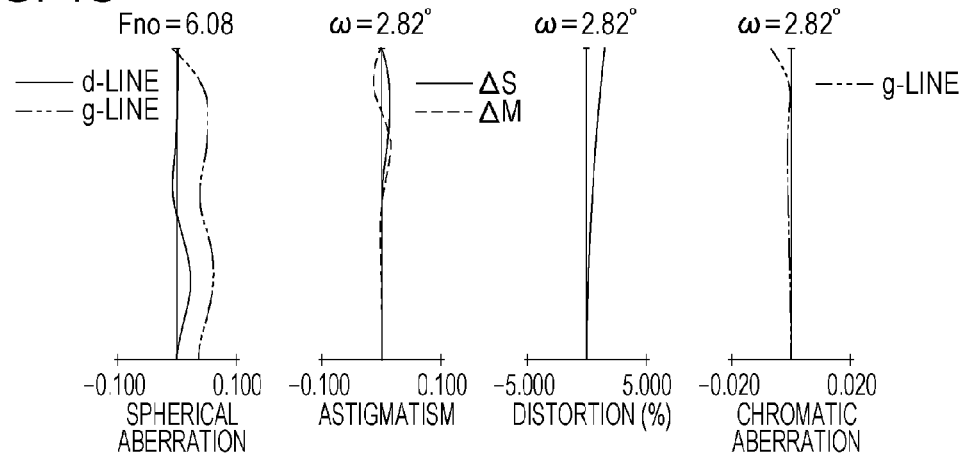

FIG. 1 is a sectional view of a zoom lens according to a first embodiment that is at a wide-angle end. FIGS. 2A, 2B, and 2C are aberration charts of the zoom lens according to the first embodiment that is at the wide-angle end, at an intermediate zooming position, and at a telephoto end, respectively. The zoom lens according to the first embodiment has a zoom ratio of 15.57 and an aperture ratio of about 3.20 to 5.70. FIG. 3 is a sectional view of a zoom lens according to a second embodiment that is at a wide-angle end. FIGS. 4A, 4B, and 4C are aberration charts of the zoom lens according to the second embodiment that is at the wide-angle end, at an intermediate zooming position, and at a telephoto end, respectively. The zoom lens according to the second embodiment has a zoom ratio of 15.95 and an aperture ratio of about 3.51 to 6.08.

Figure 5:
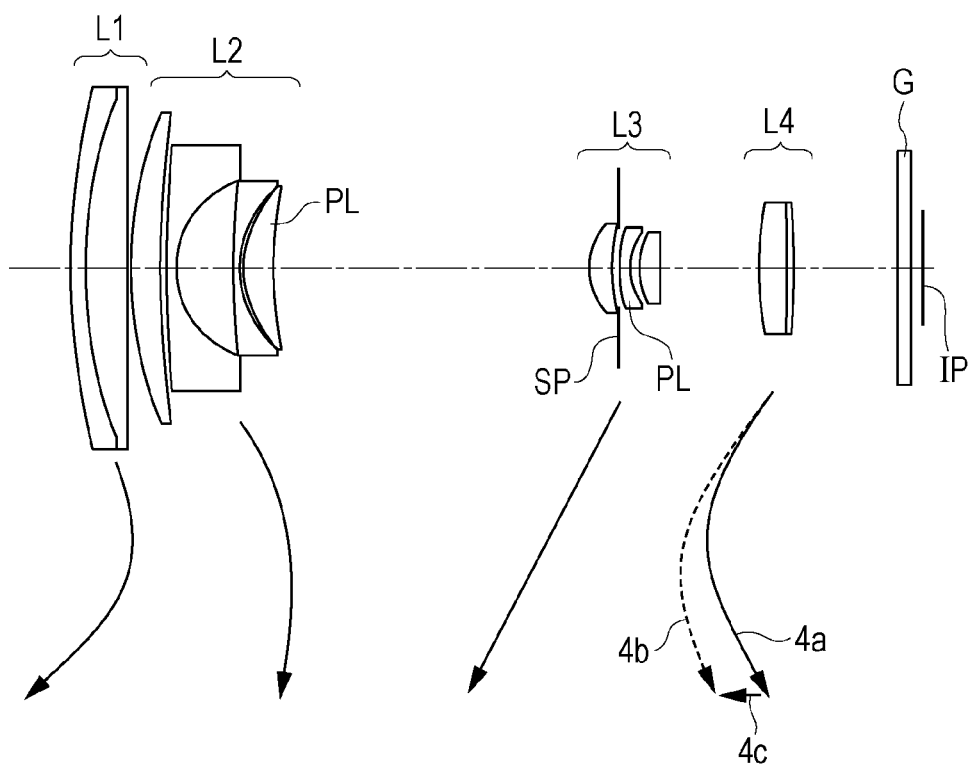
FIG. 5 is a sectional view of a zoom lens at a wide-angle end, according to a third embodiment.
Figure 7:
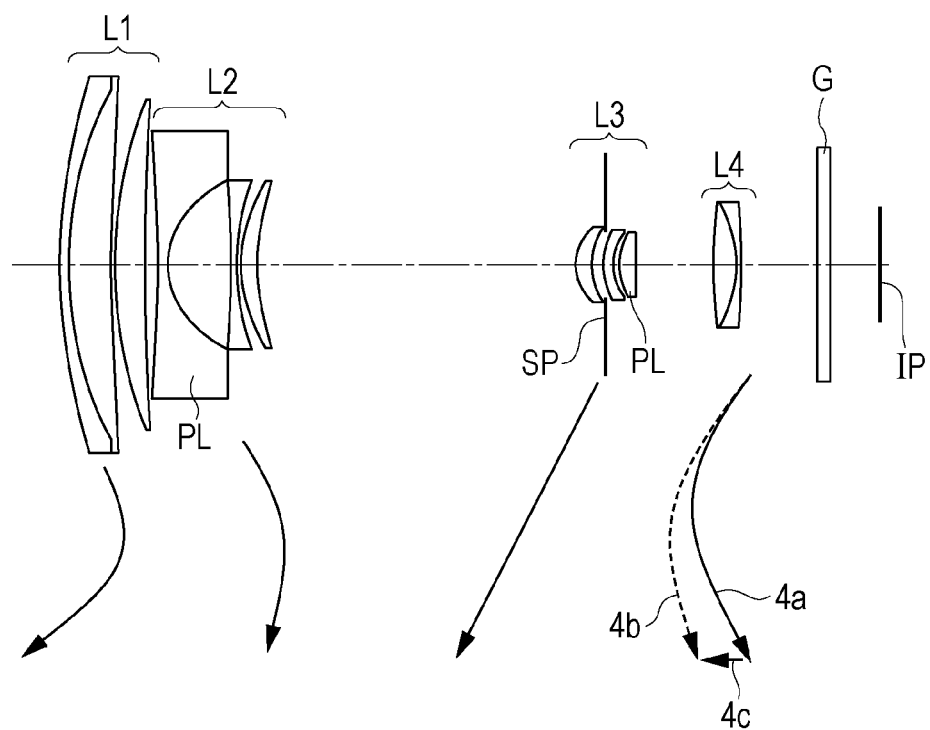
FIG. 7 is a sectional view of a zoom lens at a wide-angle end, according to a fourth embodiment.

FIG. 5 is a sectional view of a zoom lens according to a third embodiment that is at a wide-angle end. FIGS. 6A, 6B, and 6C are aberration charts of the zoom lens according to the third embodiment that is at the wide-angle end, at an intermediate zooming position, and at a telephoto end, respectively. The zoom lens according to the third embodiment has a zoom ratio of 15.89 and an aperture ratio of about 3.20 to 5.83. FIG. 7 is a sectional view of a zoom lens according to a fourth embodiment that is at a wide-angle end. FIGS. 8A, 8B, and 8C are aberration charts of the zoom lens according to the fourth embodiment that is at the wide-angle end, at an intermediate zooming position, and at a telephoto end, respectively. The zoom lens according to the fourth embodiment has a zoom ratio of 16.79 and an aperture ratio of about 3.29 to 6.08.

Figure 9:
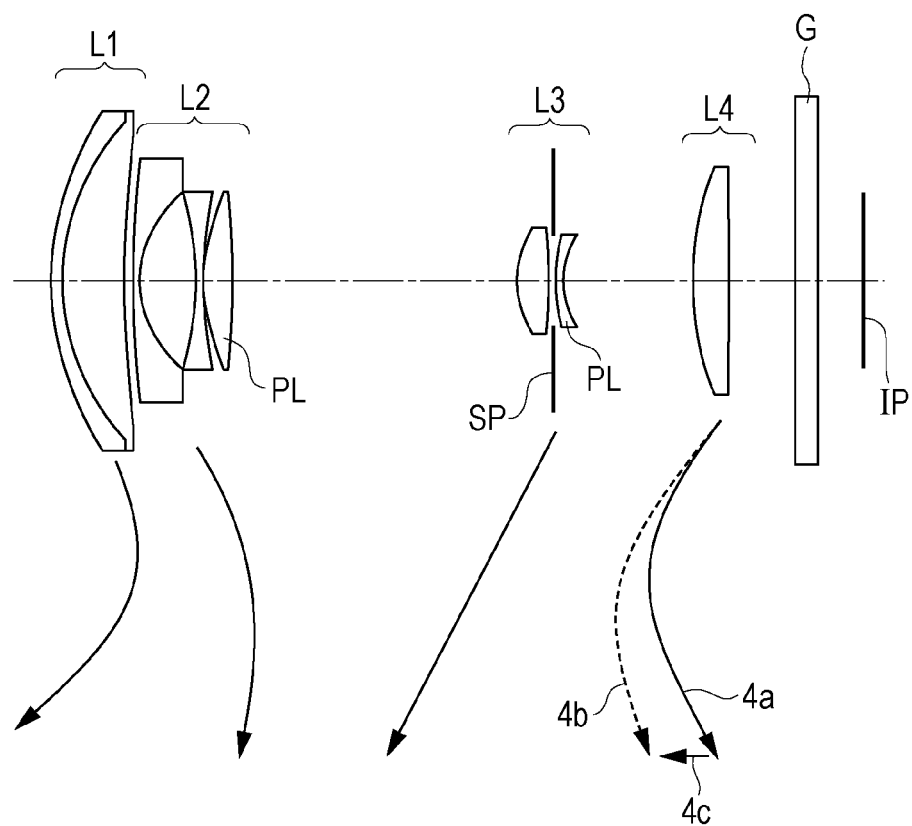
FIG. 9 is a sectional view of a zoom lens at a wide-angle end, according to a fifth embodiment.
Figure 10A:
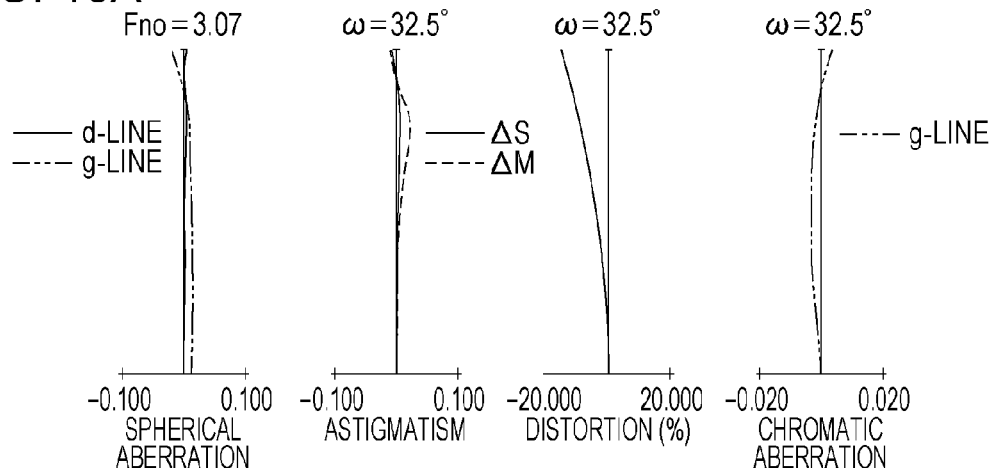
FIGS. 10A, 10B, and 10C are aberration charts of the zoom lens at the wide-angle end, at an intermediate zooming position, and at a telephoto end, respectively, according to the fifth embodiment.
Figure 10B:
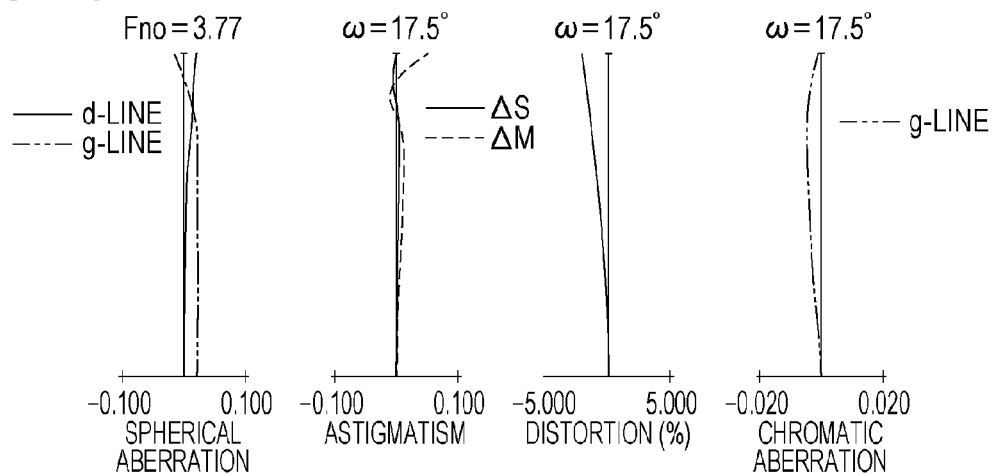
Figure 10C:
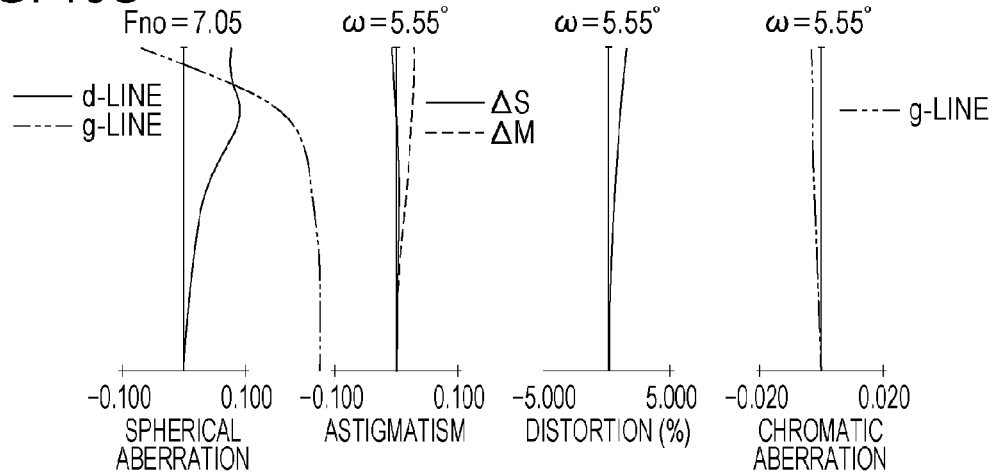
Figure 11:
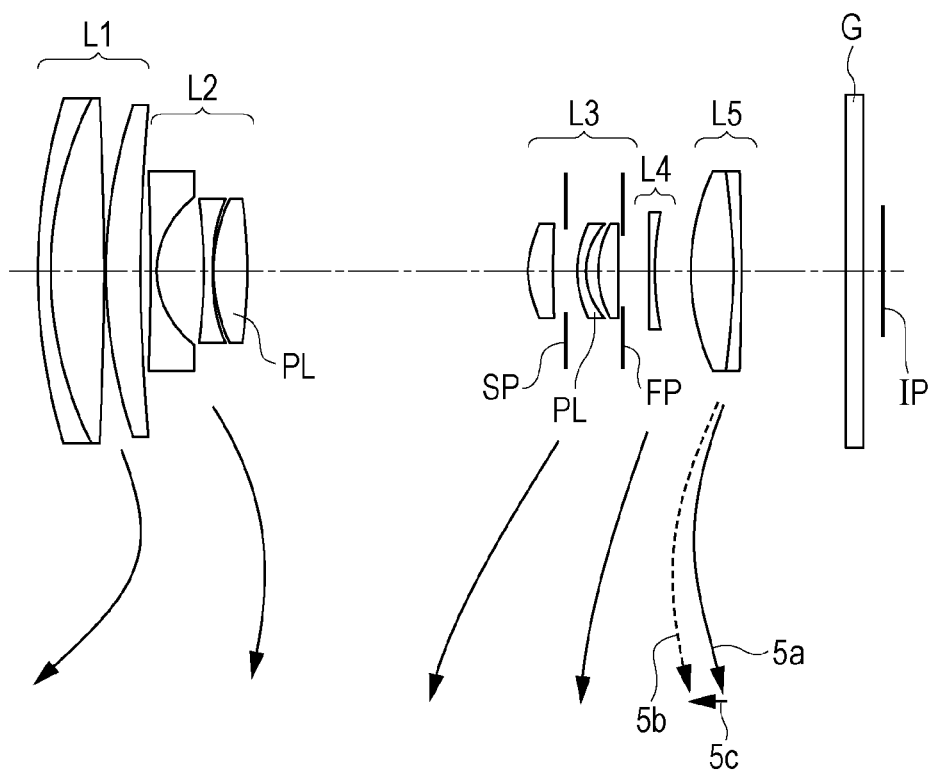
FIG. 11 is a sectional view of a zoom lens at a wide-angle end, according to a sixth embodiment.
Figure 12A:
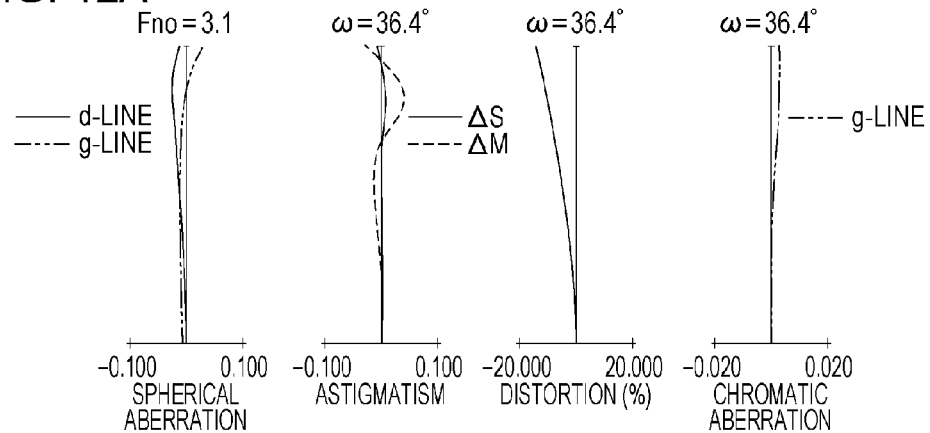
FIGS. 12A, 12B, and 12C are aberration charts of the zoom lens at the wide-angle end, at an intermediate zooming position, and at a telephoto end, respectively, according to the sixth embodiment.
Figure 12B:
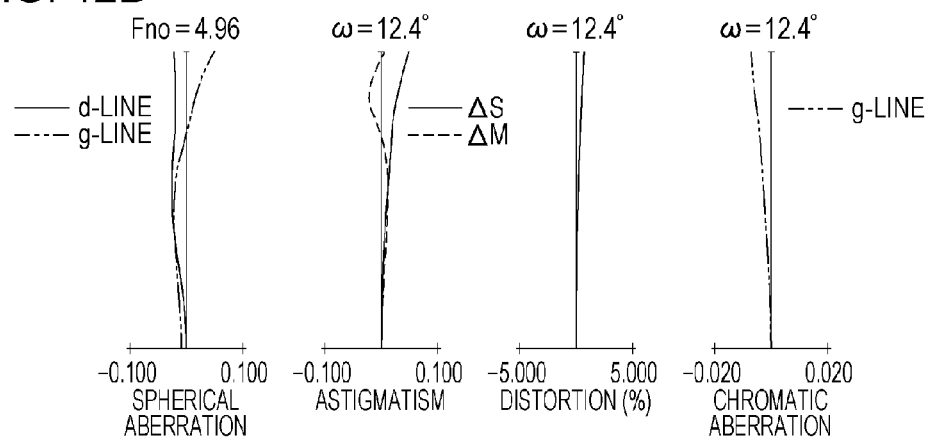
Figure 12C:
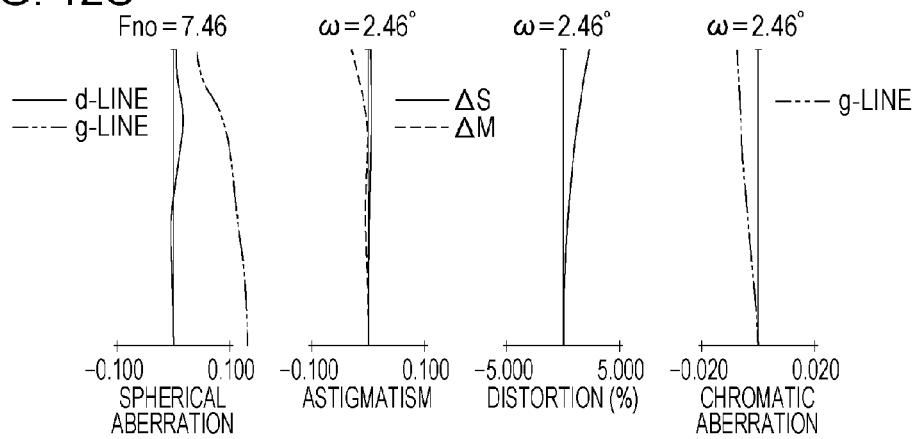

FIG. 9 is a sectional view of a zoom lens according to a fifth embodiment that is at a wide-angle end. FIGS. 10A, 10B, and 10C are aberration charts of the zoom lens according to the fifth embodiment that is at the wide-angle end, at an intermediate zooming position, and at a telephoto end, respectively. The zoom lens according to the fifth embodiment has a zoom ratio of 7.74 and an aperture ratio of about 3.07 to 7.05. FIG. 11 is a sectional view of a zoom lens according to a sixth embodiment that is at a wide-angle end. FIGS. 12A, 12B, and 12C are aberration charts of the zoom lens according to the sixth embodiment that is at the wide-angle end, at an intermediate zooming position, and at a telephoto end, respectively. The zoom lens according to the sixth embodiment has a zoom ratio of 19.91 and an aperture ratio of about 3.10 to 7.46.

Figure 13:
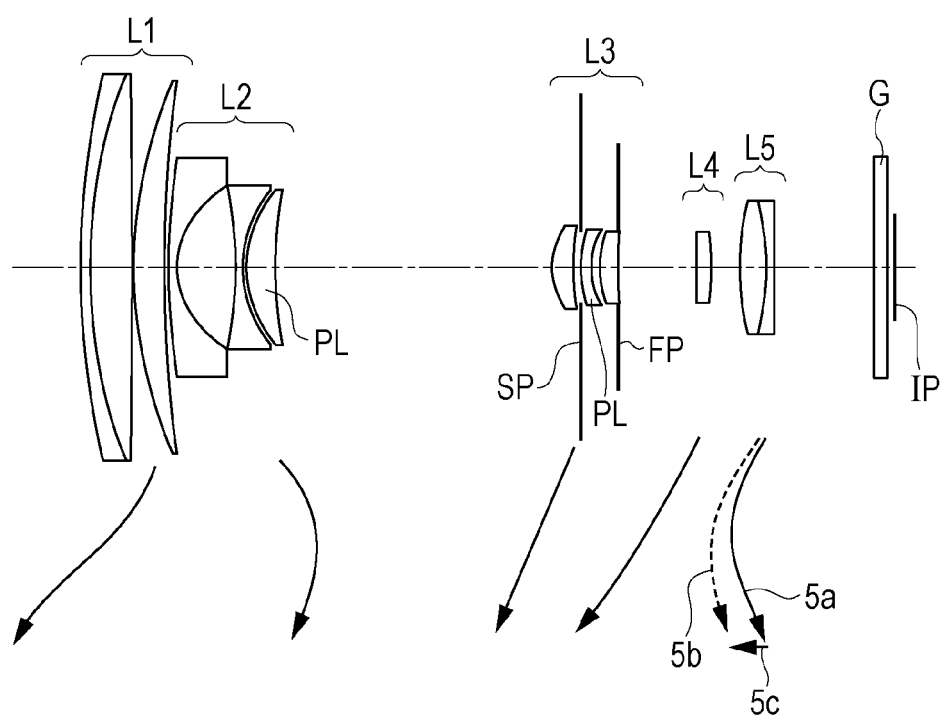
FIG. 13 is a sectional view of a zoom lens at a wide-angle end, according to a seventh embodiment.
Figure 14A:
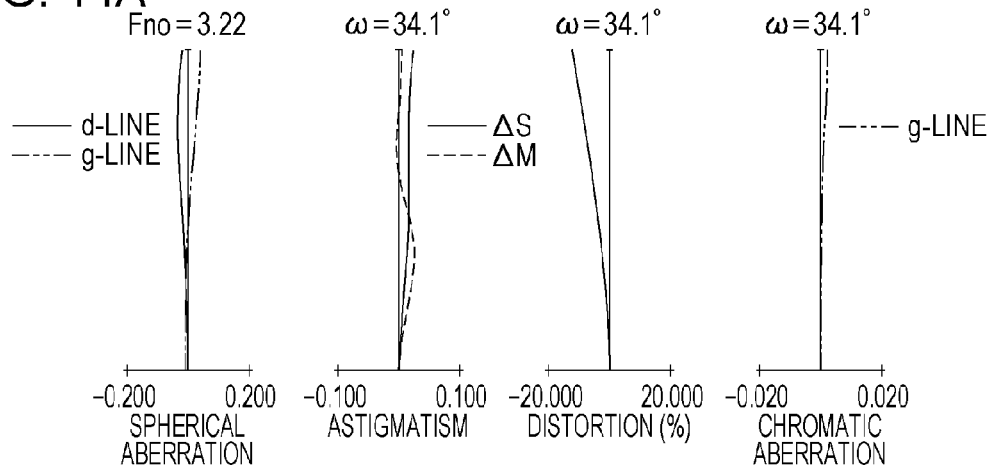
FIGS. 14A, 14B, and 14C are aberration charts of the zoom lens at the wide-angle end, at an intermediate zooming position, and at a telephoto end, respectively, according to the seventh embodiment.
Figure 14B:
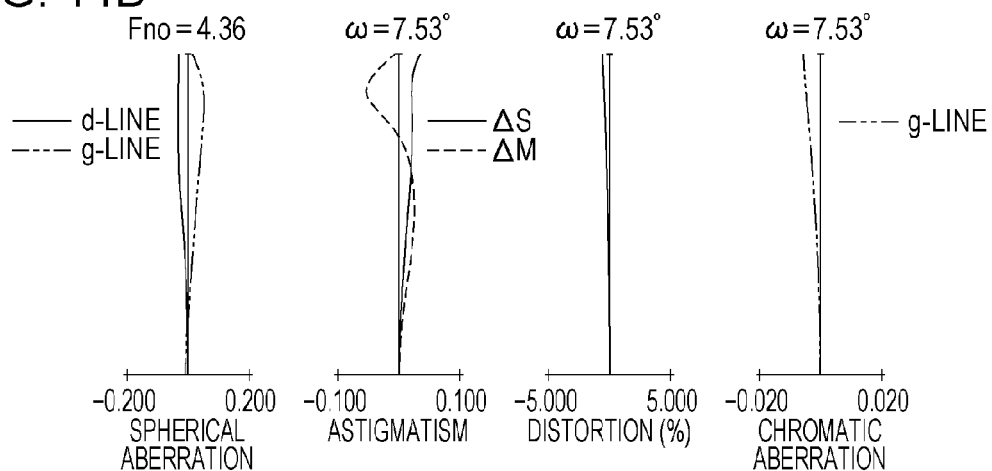
Figure 14C:
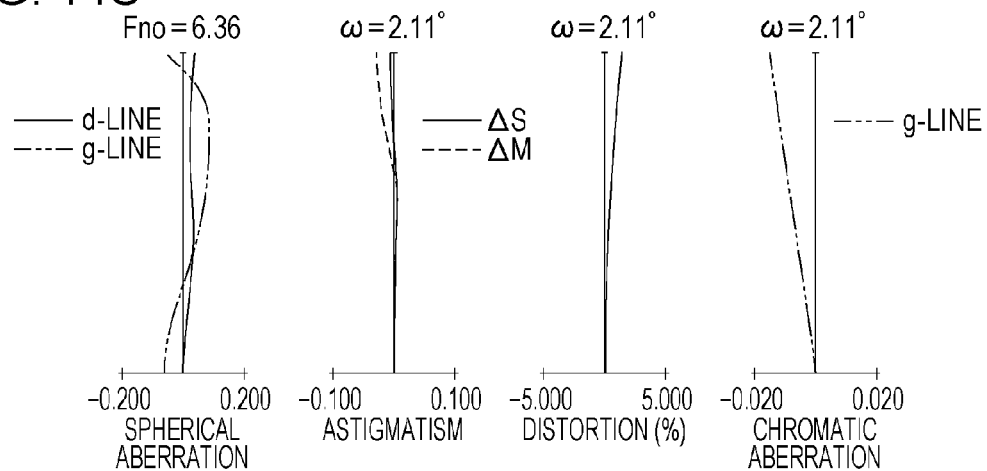
Figure 15:
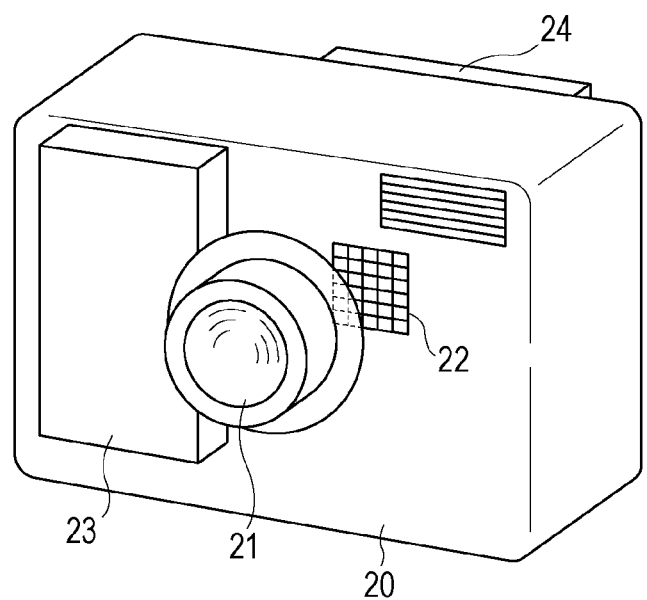
FIG. 15 is a schematic diagram of an image pickup apparatus including a zoom lens according to any of the first to the seventh embodiments of the present invention.

FIG. 13 is a sectional view of a zoom lens according to a seventh embodiment that is at a wide-angle end. FIGS. 14A, 14B, and 14C are aberration charts of the zoom lens according to the seventh embodiment that is at the wide-angle end, at an intermediate zooming position, and at a telephoto end, respectively. The zoom lens according to the seventh embodiment has a zoom ratio of 20.82 and an aperture ratio of about 3.22 to 6.36. FIG. 15 is a schematic diagram of a digital still camera (an image pickup apparatus) including any of the zoom lenses according to the first to the seventh embodiments of the present invention. The zoom lenses according to the respective embodiments are each an image pickup lens system intended for an image pickup apparatus such as a video camera, a digital still camera, a silver-halide-film camera, or a broadcast camera. The zoom lens according to each of the embodiments may also be used as a projection optical system intended for a projector. In each of the sectional views of the zoom lenses, the left side corresponds to an object side (front side), and the right side corresponds to an image side (rear side). Assuming that "i" denotes the ordinal position of a lens unit from the object side to the image side in each of the sectional views, "Li" denotes the i-th lens unit.

The zoom lenses according to the first to fifth embodiments each include, in order from the object side to the image side, a first lens unit L1 having a positive refractive power, a second lens unit L2 having a negative refractive power, a third lens unit L3 having a positive refractive power, and a fourth lens unit L4 having a positive refractive power. The zoom lenses according to the first to fifth embodiments are each a positive-lead four-unit zoom lens including four lens units. The fourth lens unit L4 having a positive refractive power corresponds to the rear lens group.

The zoom lens according to the sixth embodiment includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The zoom lens according to the sixth embodiment is a positive-lead five-unit zoom lens including five lens units. A combination of the fourth lens unit L4 having a negative refractive power and the fifth lens unit L5 having a positive refractive power corresponds to the rear lens group. The zoom lens according to the seventh embodiment includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The zoom lens according to the seventh embodiment is a positive-lead five-unit zoom lens including five lens units. A combination of the fourth lens unit L4 having a positive refractive power and the fifth lens unit L5 having a positive refractive power corresponds to the rear lens group.

In each of the embodiments, an aperture stop SP is provided in the third lens unit L3. In each of the sixth and seventh embodiments, a flare cut-off stop FP is provided on the image side of the third lens unit L3 and cuts off unnecessary light.

An optical block G corresponds to any of an optical filter, a face plate, a low-pass filter, an infrared cut-off filter, and the like. The image plane is denoted as IP. If the zoom lens is used as an image pickup optical system of a video camera or a digital still camera, the image plane IP corresponds to a solid-state image pickup device (photoelectric conversion device) such as a charge-coupled-device (CCD) sensor or a complementary-metal-oxide-semiconductor (CMOS) sensor. If the zoom lens is used as an image pickup optical system of a silver-halide-film camera, the image plane IP corresponds to a film surface.

In each of the spherical aberration charts, Fno denotes the f-number, the solid line is for d-line (at a wavelength of 587.6 nm), and the dash-dot-dot line is for g-line (at a wavelength of 435.8 nm). In each of the astigmatism charts, the solid line and the dotted line represent the sagittal image plane and the meridional image plane, respectively, for d-line. Distortion is for d-line. In each of the lateral-chromatic-aberration charts, the dash-dot-dot line is for g-line. In each of the aberration charts excluding the spherical aberration charts, ω denotes the half angle of view of a picked-up image. In each of the following embodiments, the wide-angle end and the telephoto end correspond to the extreme ends, respectively, of the zooming range within which the lens unit intended for zooming is movable along the optical axis under specific mechanical conditions.

The zoom lenses illustrated in sectional view each include resin lens elements PL. In each of the embodiments, the second lens unit L2 includes a resin lens element L2p, and the third lens unit L3 includes a resin lens element L3p. Resin lens elements are advantageous in that the weight and cost of the zoom lens are reduced. The refractive powers of the resin lens element L2p and the resin lens element L3p are of opposite signs and are set appropriately to satisfy pre-established mathematical conditions. Therefore, variations in the focus, spherical aberration, field curvature, and so forth due to changes in the temperature are corrected in good manners at every zooming position. Specifically, a combination of a resin lens element L2p having a positive refractive power and a resin lens element L3p having a negative refractive power or a combination of a resin lens element L2p having a negative refractive power and a resin lens element L3p having a positive refractive power may be employed.

In each of the first, third, and fifth to seventh embodiments, the third one of lens elements in the second lens unit L2 from the object side corresponds to a resin lens element L2p having a positive refractive power, and the second one of lens elements in the third lens unit L3 from the object side corresponds to a resin lens element L3p having a negative refractive power. In each of the second and fourth embodiments, the first one of lens elements in the second lens unit L2 from the object side corresponds to a resin lens element L2p having a negative refractive power, and the third one of lens elements in the third lens unit L3 from the object side corresponds to a resin lens element L3p having a positive refractive power. The resin lens elements employed in each of the embodiments have aspherical surfaces. Therefore, variations in spherical aberration and field curvature that may occur during zooming are corrected in good manners.

In each of the embodiments, the resin lens element L2p and the resin lens element L3p are each provided as a single lens element whose surfaces on the object side and on the image side are in contact with air. Since the resin lens element is provided as a single lens element, an aspherical surface is easily formed on each of the object side and the image side of the lens element, whereby spherical aberration and field curvature are corrected in good manners at every zooming position. Moreover, since the resin lens element is provided as a single lens element, the number of surfaces whose radii of curvature are independently changeable increases, whereby variations in aberrations (variations in spherical aberration and in field curvature) due to changes in the temperature are cancelled out in good manners. Herein, the resin lens element implies a lens element that is made of a resin material.

In each of the embodiments, the lens units move during zooming from the wide-angle end to the telephoto end. Arrows in each of the sectional views represent the loci of the respective lens units that move during zooming from the wide-angle end to the telephoto end.

Specifically, during zooming from the wide-angle end to the telephoto end in the first to fifth embodiments, the first lens unit L1 moves along a locus that is convex toward the image side, the second lens unit L2 moves along a locus that is convex toward the image side, the third lens unit L3 moves linearly toward the object side, and the fourth lens unit L4 moves along a locus that is convex toward the object side.

During zooming from the wide-angle end to the telephoto end in the sixth embodiment, the first lens unit L1 moves along a locus that is convex toward the image side, the second lens unit L2 moves along a locus that is convex toward the image side, the third lens unit L3 moves linearly toward the object side, the fourth lens unit L4 moves linearly toward the object side, and the fifth lens unit L5 moves along a locus that is convex toward the object side.

During zooming from the wide-angle end to the telephoto end in the seventh embodiment, the first lens unit L1 moves linearly toward the object side, the second lens unit L2 moves along a locus that is convex toward the image side, the third lens unit L3 moves linearly toward the object side, the fourth lens unit L4 moves linearly toward the object side, and the fifth lens unit L5 moves along a locus that is convex toward the object side.

In each of the embodiments, the first lens unit L1 and the third lens unit L3 are positioned nearer to the object side at the telephoto end than at the wide-angle end. Hence, the total lens length at the wide-angle end is reduced. Consequently, a zoom lens having a small front lens unit (first lens unit L1) and a high zoom ratio is provided.

In each of the embodiments, one of the lens units that is at the extreme end on the image side corresponds to a focus lens unit. In each of the first to fifth embodiments, the fourth lens unit L4 corresponds to the focus lens unit. In each of the sixth and seventh embodiments, the fifth lens unit L5 corresponds to the focus lens unit.

To change the focus from an object at infinity to a near object at the telephoto end in each of the first to fifth embodiments, the fourth lens unit L4 is moved toward the object side as represented by an arrow 4c illustrated in a corresponding one of the sectional views. A solid-line arrow 4a and a dotted-line arrow 4b illustrated in each of the sectional views represent loci for correcting variations in the image plane that may occur during zooming from the wide-angle end to the telephoto end when the focus is on the object at infinity and on a near object, respectively.

In each of the sixth and seventh embodiments, the focus is changed by moving the fifth lens unit L5 toward the object side as represented by an arrow 5c illustrated in a corresponding one of the sectional views. A solid-line arrow 5a and a dotted-line arrow 5b illustrated in each of the sectional views represent loci for correcting variations in the image plane that may occur during zooming from the wide-angle end to the telephoto end when the focus is on the object at infinity and on the near object, respectively.

In the sixth embodiment, the focus may be changed by moving the fourth lens unit L4 having a negative refractive power. In that case, when the focus is changed from the object at infinity to the near object at the telephoto end, the fourth lens unit L4 moves toward the image side.

In the seventh embodiment, the focus may be changed by moving the fourth lens unit L4 having a positive refractive power. In that case, when the focus is changed from the object at infinity to the near object at the telephoto end, the fourth lens unit L4 moves toward the object side.

In each of the embodiments, letting the focal length of the resin lens element L2p included in the second lens unit L2 be f2p; the focal length of the resin lens element L3p included in the third lens unit L3 be f3p; and the focal length of the entire system at the telephoto end be ft, the following conditional expressions are satisfied:

$$0.10 < |f3p/ft| < 0.23 \tag{1}$$

$$-2.40 < f2p/f3p < -0.34 \tag{2}$$

Conditional Expression (1) defines the refractive power of the resin lens element L3p of the third lens unit L3 so that the total length of the zoom lens is reduced while a high zoom ratio is realized. If the resin lens element L3p has a positive refractive power and the upper limit of Conditional Expression (1) is exceeded, the refractive power of the resin lens element L3p is reduced. To realize a high zoom ratio in such a case, the number of lens elements to be included in the third lens unit L3 increases. Consequently, the thickness of the third lens unit L3 tends to increase. If the resin lens element L3p has a negative refractive power and the upper limit of Conditional Expression (1) is exceeded, the number of lens elements to be included in the third lens unit L3 needs to be increased so as to satisfactorily correct chromatic aberration. Consequently, the thickness of the third lens unit L3 increases, and the total length of the zoom lens increases.

If Conditional Expression (1) extends below the lower limit, the refractive power of the resin lens element L3p increases. Therefore, the sensitivity to variations in the focus, field curvature, and spherical aberration due to changes in the temperature increases, making it difficult to suppress such variations that may occur during zooming. Moreover, since the refractive power of the resin lens element L3p increases, the radius of curvature of the resin lens element L3p is reduced. This increases the thickness of the resin lens element L3p and therefore increases the edge thicknesses of the resin lens element L3p. Consequently, the total length of the zoom lens increases.

Conditional Expression (2) defines the ratio of the refractive power of the resin lens element L2p included in the second lens unit L2 to the refractive power of the resin lens element L3p included in the third lens unit L3 so that variations in the focus, field curvature, and spherical aberration due to changes in the temperature are suppressed. Since the resin lens element L2p and the resin lens element L3p have refractive powers of opposite signs, variations in aberrations due to changes in the temperature are corrected in an efficient manner at every zooming position.

If the upper limit of Conditional Expression (2) is exceeded, the refractive power of the resin lens element L3p increases, making it difficult to correct variations in aberrations due to changes in the temperature. Particularly, since the lens elements included in the third lens unit L3 are highly sensitive to spherical aberration and field curvature, variations in spherical aberration and field curvature due to changes in the temperature during zooming increase. If, on the other hand, Conditional Expression (2) extends below the lower limit, the refractive power of the resin lens element L2p increases, making it difficult to correct variations in aberrations due to changes in the temperature. If the resin lens element L2p included in the second lens unit L2 has a high refractive power, variations in the focus due to changes in the temperature during zooming increase, making it difficult to cancel out such variations by using the resin lens element L3p.

In each of the embodiments, associated factors are appropriately set as described above so that Conditional Expressions (1) and (2) are satisfied. Hence, a high-zoom-ratio zoom lens whose size in the optical-axis direction is small and that exhibits high optical performance at every zooming position is provided.

Preferably, in each of the embodiments, the numerical ranges of Conditional Expressions (1) and (2) may be set as follows:

$$0.10 < |f3p/ft| < 0.22 \quad (1a)$$

$$-2.30 < f2p/f3p < -0.40 \quad (2a)$$

More preferably, the numerical ranges of Conditional Expressions (1) and (2) may be set as follows:

$$0.11 \leq |f3p/ft| < 0.21 \quad (1b)$$

$$-2.20 < f2p/f3p < -0.45 \quad (2b)$$

More preferably, in each of the embodiments, one or more of the following conditional expressions (3) to (12) may be satisfied. Here, the focal length of the second lens unit L2 is denoted as f2, the focal length of the third lens unit L3 is denoted as f3, the refractive index and the Abbe number of the resin lens element L2p included in the second lens unit L2 with respect to d-line are denoted as Nd2p and vd2p, respectively, the refractive index and the Abbe number of the resin lens element L3p included in the third lens unit L3 with respect to d-line are denoted as Nd3p and vd3p, respectively, and the temperature coefficient and the linear expansion coefficient that define the refractive index of each of the resin lens elements L2p and L3p included in the second and third lens units L2 and L3 at 20° C. are denoted as τ and α, respectively. The temperature coefficient τ that defines the refractive index is expressed as dn/dT, where n denotes the refractive index, and T denotes the temperature in degrees Celsius (C). The value of the temperature coefficient τ varies with the range of temperature.

The one or more conditional expressions that may be satisfied are as follows:

$$-30.0 < ft/f2 < -5.0 \quad (3)$$

$$3.0 < ft/f3 < 15.0 \quad (4)$$

$$1.45 < Nd2p < 2.59 \times 10^{-4} \times vd2p^2 - 2.64 \times 10^{-2} \times vd2p + 2.213 \quad (5)$$

$$vd2p < 60.0 \quad (6)$$

$$1.45 < Nd3p < 2.59 \times 10^{-4} \times vd3p^2 - 2.64 \times 10^{-2} \times vd3p + 2.213 \quad (7)$$

$$vd3p < 60.0 \quad (8)$$

$$-5.0 \times 10^{-4}/°C. < \tau < -5.0 \times 10^{-6}/°C. \quad (9)$$

$$1.0 \times 10^{-5}/°C. < \alpha < 10.0 \times 10^{-5}/°C. \quad (10)$$

$$15.0 < vd2p < 35.0 \quad (11)$$

$$15.0 < vd3p < 35.0 \quad (12)$$

Conditional Expression (3) defines an appropriate refractive power of the second lens unit L2 so that variations in aberrations due to changes in the temperature are corrected in good manners while a small, lightweight zoom lens having a high zoom ratio is provided.

If the lower limit of Conditional Expression (3) is exceeded, the negative refractive power of the second lens unit L2 increases and the Petzval sum increases. Consequently, the inclination of the image plane becomes too large to easily correct. Moreover, if the resin lens element L2p of the second lens unit L2 has a positive refractive power, the positive refractive power of the resin lens element L2p needs to be increased so as to correct chromatic aberration. Consequently, the radius of curvature of the resin lens element L2p is reduced, and the thickness of the resin lens element L2p increases. In contrast, if the resin lens element L2p has a negative refractive power, the refractive power of the resin lens element L2p needs to be increased so as to compensate for the refractive power of the second lens unit L2. Consequently, the curvature of the resin lens element L2p increases, and the thickness of the resin lens element L2p increases. Hence, the total lens length increases.

If the upper limit of Conditional Expression (3) is exceeded, the negative refractive power of the second lens unit L2 is relatively reduced. Consequently, the length of travel of the second lens unit L2 during zooming increases, and the diameter of the front lens unit increases, making it difficult to reduce the size and the weight of the zoom lens.

Conditional Expression (4) defines an appropriate refractive power of the third lens unit L3.

If the upper limit of Conditional Expression (4) is exceeded, the positive refractive power of the third lens unit L3 increases and the Petzval sum increases. Consequently, the inclination of the image plane becomes too large to easily correct. Moreover, if the resin lens element L3p of the third lens unit L3 has a negative refractive power, the negative refractive power of the resin lens element L3p needs to be increased so as to correct chromatic aberration. Consequently, the radius of curvature of the resin lens element L3p is reduced, and the thickness of the resin lens element L3p increases. In contrast, if the resin lens element L3p has a positive refractive power, the positive refractive power of the resin lens element L3p needs to be increased so as to compensate for the refractive power of the third lens unit L3. Consequently, the curvature of the resin lens element L3p increases, and the thickness of the resin lens element L3p increases. Hence, the total lens length increases.

If the lower limit of Conditional Expression (4) is exceeded, the refractive power of the third lens unit L3 is relatively reduced. Consequently, the length of travel of the third lens unit L3 during zooming increases, and the total lens length increases.

If the lower limit of Conditional Expression (5) is exceeded, the radius of curvature of the resin lens element L2p is reduced, increasing the thickness of the resin lens element L2p so as to provide a satisfactory edge thickness of the resin lens element L2p. Consequently, the total lens length increases.

If the upper limit of Conditional Expression (5) is exceeded, the refractive index of a lens element having a refractive power with a sign that is opposite to that of the refractive power of the resin lens element L2p needs to be increased so as to reduce the Petzval sum. However, it is difficult to satisfactorily correct field curvature within the range of the refractive index of any available glass material. Furthermore, if the resin lens element L2p has a negative refractive power and the upper limit of Conditional Expression (5) is exceeded, the Abbe number tends to be reduced. Therefore, it is difficult to satisfactorily correct chromatic aberration.

If the upper limit of Conditional Expression (6) is exceeded, the Abbe numbers of the lens elements of the second lens unit L2 excluding the resin lens element L2p need to be increased so as to correct chromatic aberration. Therefore, the refractive index of the second lens unit L2 as a whole is reduced. Consequently, the radii of curvature of the respective lens elements are reduced, and the thickness of the second lens unit L2 increases.

If the lower limit of Conditional Expression (7) is exceeded, the radius of curvature of the resin lens element L3p is reduced, increasing the thickness of the resin lens element L3p so as to provide a satisfactory edge thickness of the resin lens element L3p. Consequently, the total lens length increases. Moreover, if a resin lens element having a small radius of curvature is included in the third lens unit L3 that tends to cause spherical aberration and field curvature, the shape of the lens surface changes significantly with changes in the temperature, increasing variations in aberrations.

If the upper limit of Conditional Expression (7) is exceeded, the refractive index of a lens element having a refractive power with a sign that is opposite to that of the refractive power of the resin lens element L3p needs to be increased so as to reduce the Petzval sum. However, it is difficult to satisfactorily correct field curvature within the range of the refractive index of any available glass material. Furthermore, if the resin lens element L3p has a positive refractive power and the upper limit of Conditional Expression (7) is exceeded, the Abbe number tends to be reduced. Therefore, it is difficult to satisfactorily correct chromatic aberration.

If the upper limit of Conditional Expression (8) is exceeded, the Abbe numbers of the lens elements included in the third lens unit L3 excluding the resin lens element L3p need to be increased so as to correct chromatic aberration, making the refractive index of the third lens unit L3 as a whole smaller. Consequently, the radii of curvature of the respective lens elements are reduced, and the thickness of the third lens unit L3 increases.

If the temperature coefficient $\tau$ that defines the refractive index of each of the resin lens elements L2p and L3p is within the range defined by Conditional Expression (9), variations in the focus, field curvature, and spherical aberration due to changes in the refractive indices of the resin lens elements L2p and L3p are corrected in good manners at every zooming position.

If the linear expansion coefficient $\alpha$ for each of the resin lens elements L2p and L3p are within the range defined by Conditional Expression (10), variations in the focus, field curvature, and aspherical aberration due to the expansion or contraction of the resin lens elements L2p and L3p caused by changes in the temperature are corrected in good manners at every zooming position.

If the lower limit of Conditional Expression (11) is exceeded, the Abbe number goes out of the range defined for available glass materials. If the upper limit of Conditional Expression (11) is exceeded, it is difficult to simultaneously realize the correction of chromatic aberration and the reduction of the Petzval sum.

If the lower limit of Conditional Expression (12) is exceeded, it is difficult to simultaneously realize the correction of chromatic aberration and the reduction of the Petzval sum. If the upper limit of Conditional Expression (12) is exceeded, it is difficult to correct the longitudinal chromatic aberration and the lateral chromatic aberration on the telephoto side.

To maximize the advantageous effects produced on the basis of Conditional Expressions (3) to (12), the numerical ranges of Conditional Expressions (3) to (12) may be preferably set as follows:

$$-20.0 < ft/f2 < -5.0 \tag{3a}$$

$$3.0 < ft/f3 < 12.0 \tag{4a}$$

$$1.49 < Nd2p < 2.59 \times 10^{-4} \times vd2p^2 - 2.64 \times 10^{-2} \times vd2p + 2.213 \tag{5a}$$

$$vd2p < 58.0 \tag{6a}$$

$$1.49 < Nd3p < 2.59 \times 10^{-4} \times vd3p^2 - 2.64 \times 10^{-2} \times vd3p + 2.213 \tag{7a}$$

$$vd3p < 58.0 \tag{8a}$$

$$-2.5 \times 10^{-4}/°C. < \tau < -6.0 \times 10^{-6}/°C. \tag{9a}$$

$$3.0 \times 10^{-5}/°C. < \alpha < 10.0 \times 10^{-5}/°C. \tag{10a}$$

$$17.5 < vd2p < 33.0 \tag{11a}$$

$$17.5 < vd3p < 33.0 \tag{12a}$$

More preferably, the numerical ranges of Conditional Expressions (3) to (12) may be set as follows:

$$-15.0 < ft/f2 < -6.0 \quad (3b)$$

$$4.0 < ft/f3 < 10.0 \quad (4b)$$

$$1.50 < Nd2p < 2.59 \times 10^{-4} \times vd2p^2 - 2.64 \times 10^{-2} \times vd2p + 2.213 \quad (5b)$$

$$vd2p < 57.0 \quad (6b)$$

$$1.50 < Nd3p < 2.59 \times 10^{-4} \times vd3p^2 - 2.64 \times 10^{-2} \times vd3p + 2.213 \quad (7b)$$

$$vd3p < 57.0 \quad (8b)$$

$$-1.0 \times 10^{-4}/°C. < \tau < -8.0 \times 10^{-6}/°C. \quad (9b)$$

$$5.0 \times 10^{-5}/°C. < \alpha < 10.0 \times 10^{-5}/°C. \quad (10b)$$

$$20.0 < vd2p < 31.0 \quad (11b)$$

$$20.0 < vd3p < 31.0 \quad (12b)$$

Numerical Examples 1 to 7 corresponding to the first to seventh embodiments of the present invention are given below. In each of Numerical Examples 1 to 7, i denotes the ordinal position of an optical surface from the object side, ri denotes the radius of curvature of the i-th optical surface (the i-th surface), di denotes the distance between the i-th surface and the i+1-th surface, and ndi and vdi denote the refractive index and the Abbe number, respectively, of the material forming the i-th optical member with respect to d-line.

Letting the eccentricity be k; the aspherical coefficients be A4, A6, A8, and A10; and the displacement of the surface vertex in the optical-axis direction at a height h from the optical axis be x, the aspherical shape is expressed as follows:

$$x = (h^2/R) / [1 + [1 - (1+k)(h/R)^2]^{1/2}] + A4h^4 + A6h^6 + A8h^8 + A10h^{10}$$

where R denotes the paraxial radius of curvature, and "e-Z" denotes "$10^{-Z}$". In each of Numerical Examples 1 to 7, two of the surfaces at the extreme end on the image side correspond to the surfaces of the optical block such as a filter or a face plate. An asterisk "*" next to the surface number denotes an aspherical surface.

In each of Numerical Examples 1 to 7, the back focal length (BF) corresponds to the length obtained through aerial conversion of the distance from one of the surfaces of the lens system that is at the extreme end on the image side to the paraxial image plane. The total lens length is the sum of the distance from the surface that is at the extreme end on the object side to the final lens surface and the back focal length. The correspondence between Numerical Examples 1 to 7 and the conditional expressions given above is summarized in Table 1.

Numerical Example 1

| Unit: mm | | | | |
|---|---|---|---|---|
| Data on surfaces | | | | |
| Surface No. | r | d | nd | vd |
| 1 | 57.203 | 1.00 | 1.85478 | 24.8 |
| 2 | 31.937 | 2.90 | 1.49700 | 81.5 |
| 3 | 7050.531 | 0.20 | | |
| 4 | 27.745 | 2.20 | 1.69680 | 55.5 |
| 5 | 95.755 | (variable) | | |
| 6 | 63.640 | 0.65 | 1.69680 | 55.5 |
| 7 | 7.016 | 3.90 | | |
| 8 | −18.939 | 0.50 | 1.48749 | 70.2 |
| 9 | 8.130 | 0.20 | | |
| 10* | 7.244 | 1.90 | 1.63550 | 23.9 | L2p |
| 11* | 20.224 | (variable) | | |
| 12* | 5.035 | 1.50 | 1.58313 | 59.4 |
| 13* | 10.904 | 0.58 | | |
| 14 (stop) | ∞ | 0.00 | | |
| 15* | 14.053 | 0.70 | 1.60737 | 27.0 | L3p |
| 16* | 5.364 | 0.60 | | |
| 17 | 7.564 | 1.40 | 1.51823 | 58.9 |
| 18 | −490.347 | (variable) | | |
| 19 | 18.981 | 1.85 | 1.77250 | 49.6 |
| 20 | −23.994 | 0.50 | 1.80518 | 25.4 |
| 21 | 151.560 | (variable) | | |
| 22 | ∞ | 1.00 | 1.51633 | 64.1 |
| 23 | ∞ | 0.79 | | |
| Image plane | ∞ | | | |

Data on aspherical surfaces

10th surface

K = −1.70439e−001 A 4 = −4.48101e−004 A 6 = 9.86364e−006 A 8 = −5.19319e−007 A10 = 2.10602e−008 A12 = −5.13815e−010

11th surface

K = −1.30221e+001 A 4 = −1.37531e−004 A 6 = 1.15085e−006 A 8 = 2.02231e−007 A10 = −6.22681e−009 A12 = −1.31485e−010

12th surface

K = 4.00175e−001 A 4 = −1.11147e−003 A 6 = −9.23126e−006 A 8 = 1.76880e−007 A10 = −3.25275e−007 A12 = 5.29989e−008

13th surface

K = −2.28521e+001 A 4 = 2.76524e−004 A 6 = 3.56901e−005 A 8 = 1.02905e−005 A10 = −1.38856e−006 A12 = 1.77055e−007

15th surface

K = 2.26273e+000 A 4 = 6.91787e−004 A 6 = 1.16931e−004 A 8 = −1.38331e−005 A10 = 5.39652e−007 A12 = 4.14911e−008

16th surface

K = 5.52854e−001 A 4 = 2.52484e−003 A 6 = −6.59302e−005 A 8 = −2.37895e−006 A10 = −1.08694e−006 A12 = 8.35014e−008

Other data
Zoom ratio 15.57

| | Wide-angle | Intermediate | Telephoto |
|---|---|---|---|
| Focal length | 5.16 | 27.77 | 80.25 |
| F-number | 3.20 | 4.70 | 5.70 |
| Half angle of view | 33.48 | 7.94 | 2.76 |
| Image height | 3.41 | 3.88 | 3.88 |
| Total lens length | 58.02 | 67.00 | 81.86 |
| BF | 8.42 | 18.21 | 8.35 |
| d 5 | 0.26 | 18.88 | 28.84 |
| d11 | 21.41 | 3.22 | 0.12 |
| d18 | 7.86 | 6.62 | 24.49 |
| d21 | 6.12 | 15.91 | 6.04 |

Data on zoom lens units

| Unit | Starting surface | Focal length | Lens structural length | Front principal point | Rear principal point |
|---|---|---|---|---|---|
| 1 | 1 | 46.34 | 6.30 | 1.52 | −2.46 |
| 2 | 6 | −7.81 | 7.15 | 1.48 | −4.02 |
| 3 | 12 | 14.46 | 4.78 | −0.27 | −3.85 |
| 4 | 19 | 29.10 | 2.35 | −0.25 | −1.55 |

Unit: mm

Data on individual lens elements

| Lens element | Starting surface | Focal length |
|---|---|---|
| 1 | 1 | −86.16 |
| 2 | 2 | 64.54 |
| 3 | 4 | 55.33 |
| 4 | 6 | −11.37 |
| 5 | 8 | −11.60 |
| 6 | 10 | 16.81 |
| 7 | 12 | 14.66 |
| 8 | 15 | −14.73 |
| 9 | 17 | 14.39 |
| 10 | 19 | 13.98 |
| 11 | 20 | −25.69 |

Numerical Example 2

Unit: mm

Data on surfaces

| Surface No. | r | d | nd | vd | |
|---|---|---|---|---|---|
| 1 | 36.769 | 0.60 | 1.85478 | 24.8 | |
| 2 | 24.756 | 2.65 | 1.49700 | 81.5 | |
| 3 | 113.872 | 0.20 | | | |
| 4 | 33.575 | 1.90 | 1.69680 | 55.5 | |
| 5 | 199.347 | (variable) | | | |
| 6* | −53.794 | 0.60 | 1.53110 | 55.9 | L2p |
| 7* | 6.374 | 4.39 | | | |
| 8 | −40.478 | 0.50 | 1.72916 | 54.7 | |
| 9 | 16.817 | 0.20 | | | |
| 10 | 10.458 | 1.15 | 1.92286 | 18.9 | |
| 11 | 18.086 | (variable) | | | |
| 12* | 4.316 | 1.10 | 1.55332 | 71.7 | |
| 13 | 8.995 | 0.50 | | | |
| 14 (stop) | ∞ | 0.00 | | | |
| 15 | 6.580 | 0.70 | 1.80000 | 29.8 | |
| 16 | 3.910 | 0.40 | | | |
| 17* | 7.879 | 1.10 | 1.53110 | 55.9 | L3p |
| 18* | −287.147 | (variable) | | | |
| 19 | 24.710 | 1.30 | 1.77250 | 49.6 | |
| 20 | −15.363 | 0.30 | 1.80518 | 25.4 | |
| 21 | −151.119 | (variable) | | | |
| 22 | ∞ | 1.00 | 1.51633 | 64.1 | |
| 23 | ∞ | 3.49 | | | |
| Image plane | ∞ | | | | |

Data on aspherical surfaces

6th surface

K = −2.37254e+002 A 4 = 9.89982e−005 A 6 = −3.45844e−007 A 8 = −1.61877e−008 A10 = 6.42112e−011 A12 = 7.73097e−013

7th surface

K = −9.94846e−003 A 4 = 3.05312e−004 A 6 = −3.94194e−006 A 8 = 3.79377e−007 A10 = 7.12792e−010 A12 = −2.08402e−010

12th surface

K = −1.19416e−001 A 4 = −3.75959e−004 A 6 = 1.11166e−005 A 8 = −2.50759e−006 A10 = 3.68639e−007 A12 = 1.92398e−008

17th surface

K = −7.82984e−001 A 4 = 5.96118e−004 A 6 = −1.35936e−004 A 8 = 9.40146e−006 A10 = −1.46695e−006 A12 = −1.29864e−006

18th surface

K = −1.24244e+005 A 4 = −2.11789e−004 A 6 = 2.58967e−006 A 8 = 7.82902e−006 A10 = −8.76763e−006 A12 = 5.50743e−008

Unit: mm

Other data
Zoom ratio 15.95

| | Wide-angle | Intermediate | Telephoto |
|---|---|---|---|
| Focal length | 4.94 | 27.92 | 78.80 |
| F-number | 3.51 | 5.15 | 6.08 |
| Half angle of view | 34.61 | 7.90 | 2.82 |
| Image height | 3.41 | 3.88 | 3.88 |
| Total lens length | 55.38 | 64.35 | 79.21 |
| BF | 10.26 | 19.35 | 9.66 |
| d 5 | 0.65 | 19.28 | 29.23 |
| d11 | 22.00 | 3.81 | 0.70 |
| d18 | 5.39 | 4.85 | 22.54 |
| d21 | 5.25 | 14.33 | 4.65 |

Data on zoom lens units

| Unit | Starting surface | Focal length | Lens structural length | Front principal point | Rear principal point |
|---|---|---|---|---|---|
| 1 | 1 | 46.34 | 5.35 | 1.03 | −2.41 |
| 2 | 6 | −7.81 | 6.84 | 1.33 | −4.03 |
| 3 | 12 | 14.46 | 3.80 | −1.05 | −3.62 |
| 4 | 19 | 29.10 | 1.60 | 0.09 | −0.81 |

Data on individual lens elements

| Lens element | Starting surface | Focal length |
|---|---|---|
| 1 | 1 | −90.73 |
| 2 | 2 | 63.02 |
| 3 | 4 | 57.67 |
| 4 | 6 | −10.69 |
| 5 | 8 | −16.23 |
| 6 | 10 | 25.06 |
| 7 | 12 | 13.83 |
| 8 | 15 | −13.63 |
| 9 | 17 | 14.46 |
| 10 | 19 | 12.44 |
| 11 | 20 | −21.26 |

Numerical Example 3

Unit: mm

Data on surfaces

| Surface No. | r | d | nd | vd | |
|---|---|---|---|---|---|
| 1 | 47.548 | 1.00 | 1.85478 | 24.8 | |
| 2 | 31.684 | 2.90 | 1.49700 | 81.5 | |
| 3 | 709.473 | 0.20 | | | |
| 4 | 27.560 | 2.00 | 1.69680 | 55.5 | |
| 5 | 71.116 | (variable) | | | |
| 6 | 116.559 | 0.65 | 1.69680 | 55.5 | |
| 7 | 6.113 | 3.90 | | | |
| 8 | 89.535 | 0.50 | 1.48749 | 70.2 | |
| 9 | 7.264 | 0.20 | | | |
| 10* | 7.322 | 2.00 | 1.63550 | 23.9 | L2p |
| 11* | 16.651 | (variable) | | | |
| 12* | 4.297 | 1.50 | 1.58313 | 59.4 | |
| 13* | 9.871 | 0.58 | | | |
| 14 (stop) | ∞ | 0.00 | | | |
| 15* | 21.242 | 0.70 | 1.60737 | 27.0 | L3p |
| 16* | 4.309 | 0.60 | | | |
| 17 | 5.268 | 1.40 | 1.51823 | 58.9 | |
| 18 | 65.131 | (variable) | | | |
| 19 | 34.862 | 1.85 | 1.77250 | 49.6 | |
| 20 | 439.314 | 0.50 | 1.80518 | 25.4 | |
| 21 | −64.421 | (variable) | | | |
| 22 | ∞ | 1.00 | 1.51633 | 64.1 | |

-continued

Unit: mm

| | | |
|---|---|---|
| 23 | ∞ | 0.79 |
| Image plane | ∞ | |

Data on aspherical surfaces

10th surface

K = −2.56117e−001 A 4 = −2.25456e−004 A 6 = 1.02120e−005 A 8 = −3.39102e−007 A10 = 1.24412e−008 A12 = −2.48564e−010

11th surface

K = −1.81471e+001 A 4 = 3.63649e−005 A 6 = −9.77458e−006 A 8 = 3.13539e−007 A10 = −6.99280e−009 A12 = −9.45264e−011

12th surface

K = 5.35730e−001 A 4 = −1.09921e−003 A 6 = −4.57317e−005 A 8 = −1.37667e−006 A10 = 2.94977e−007 A12 = 1.41087e−008

13th surface

K = −1.06650e+001 A 4 = 3.80632e−004 A 6 = 2.45994e−004 A 8 = 1.72528e−005 A10 = −1.26302e−006 A12 = 1.29932e−007

15th surface

K = 4.49208e+000 A 4 = 1.87248e−003 A 6 = 2.04984e−004 A 8 = −1.59008e−005 A10 = −1.23179e−006 A12 = −7.04818e−008

16th surface

K = 1.35013e+000 A 4 = 2.54657e−003 A 6 = −1.68711e−004 A 8 = −3.20779e−005 A10 = −4.08649e−006 A12 = −3.78599e−007

Other data
Zoom ratio 15.89

| | Wide-angle | Intermediate | Telephoto |
|---|---|---|---|
| Focal length | 5.17 | 27.90 | 82.14 |
| F-number | 3.20 | 4.75 | 5.83 |
| Half angle of view | 33.41 | 7.91 | 2.70 |
| Image height | 3.41 | 3.88 | 3.88 |
| Total lens length | 57.68 | 66.66 | 81.52 |
| BF | 9.12 | 18.88 | 8.45 |
| d 5 | 0.43 | 19.06 | 29.02 |
| d11 | 21.40 | 3.20 | 0.10 |
| d18 | 6.76 | 5.55 | 23.99 |
| d21 | 6.82 | 16.57 | 6.14 |

Data on zoom lens units

| Unit | Starting surface | Focal length | Lens structural length | Front principal point | Rear principal point |
|---|---|---|---|---|---|
| 1 | 1 | 46.34 | 6.10 | 1.06 | −2.80 |
| 2 | 6 | −7.81 | 7.25 | 1.07 | −4.48 |
| 3 | 12 | 14.46 | 4.78 | −0.72 | −4.23 |
| 4 | 19 | 29.10 | 2.35 | 0.48 | −0.85 |

Data on individual lens elements

| Lens element | Starting surface | Focal length |
|---|---|---|
| 1 | 1 | −114.42 |
| 2 | 2 | 66.64 |
| 3 | 4 | 63.38 |
| 4 | 6 | −9.28 |
| 5 | 8 | −16.25 |
| 6 | 10 | 18.98 |
| 7 | 12 | 11.88 |
| 8 | 15 | −9.04 |
| 9 | 17 | 10.97 |
| 10 | 19 | 48.92 |
| 11 | 20 | 69.81 |

Numerical Example 4

Unit: mm

Data on surfaces

| Surface No. | r | d | nd | vd | |
|---|---|---|---|---|---|
| 1 | 42.869 | 0.60 | 1.85478 | 24.8 | |
| 2 | 26.442 | 2.95 | 1.49700 | 81.5 | |
| 3 | 160.460 | 0.20 | | | |
| 4 | 30.623 | 2.10 | 1.69680 | 55.5 | |
| 5 | 158.033 | (variable) | | | |
| 6* | −28.071 | 0.60 | 1.53110 | 55.9 | L2p |
| 7* | 6.124 | 4.39 | | | |
| 8 | −67.086 | 0.50 | 1.72916 | 54.7 | |
| 9 | 21.276 | 0.20 | | | |
| 10 | 10.719 | 1.15 | 1.92286 | 18.9 | |
| 11 | 16.641 | (variable) | | | |
| 12* | 3.665 | 1.10 | 1.55332 | 71.7 | |
| 13 | 4.258 | 0.80 | | | |
| 14 (stop) | ∞ | 0.00 | | | |
| 15 | 5.816 | 0.70 | 1.80000 | 29.8 | |
| 16 | 3.786 | 0.40 | | | |
| 17* | 5.125 | 1.10 | 1.53110 | 55.9 | L3p |
| 18* | −315.545 | (variable) | | | |
| 19 | 29.872 | 1.65 | 1.77250 | 49.6 | |
| 20 | −8.437 | 0.30 | 1.80518 | 25.4 | |
| 21 | −63.726 | (variable) | | | |
| 22 | ∞ | 1.00 | 1.51633 | 64.1 | |
| 23 | ∞ | 3.26 | | | |
| Image plane | ∞ | | | | |

Data on aspherical surfaces

6th surface

K = −4.68248e+001 A 4 = 9.60704e−005 A 6 = 1.28596e−006 A 8 = −3.56499e−008 A10 = 1.19549e−010 A12 = 6.58136e−013

7th surface

K = −4.40854e−001 A 4 = 4.30239e−004 A 6 = 4.76441e−006 A 8 = 2.85714e−007 A10 = 2.06561e−008 A12 = −6.12536e−010

12th surface

K = −2.54296e−001 A 4 = −1.22040e−004 A 6 = 3.42432e−005 A 8 = 1.02144e−006 A10 = −1.09929e−007 A12 = 2.40967e−008

17th surface

K = −3.65424e−001 A 4 = 1.43352e−003 A 6 = −1.16264e−004 A 8 = 7.55215e−006 A10 = −2.86315e−006 A12 = −9.08714e−007

18th surface

K = −7.53220e+004 A 4 = 7.97250e−004 A 6 = −2.75252e−005 A 8 = 1.23320e−005 A10 = −8.68427e−006 A12 = −1.26292e−007

Other data
Zoom ratio 16.79

| | Wide-angle | Intermediate | Telephoto |
|---|---|---|---|
| Focal length | 4.73 | 25.51 | 79.39 |
| F-number | 3.29 | 4.68 | 6.08 |
| Half angle of view | 35.79 | 8.64 | 2.79 |
| Image height | 3.41 | 3.88 | 3.88 |
| Total lens length | 56.59 | 65.57 | 80.43 |
| BF | 10.03 | 17.69 | 6.78 |
| d 5 | 0.95 | 19.58 | 29.53 |
| d11 | 22.00 | 3.81 | 0.70 |
| d18 | 5.39 | 6.27 | 25.18 |
| d21 | 5.25 | 12.92 | 2.01 |

Data on zoom lens units

| Unit | Starting surface | Focal length | Lens structural length | Front principal point | Rear principal point |
|---|---|---|---|---|---|
| 1 | 1 | 46.34 | 5.85 | 1.35 | −2.40 |
| 2 | 6 | −7.81 | 6.84 | 0.98 | −4.44 |

-continued

Unit: mm

| 3 | 12 | 14.46 | 4.10 | −0.33 | −3.43 |
| 4 | 19 | 29.10 | 1.95 | 0.30  | −0.81 |

Data on individual lens elements

| Lens element | Starting surface | Focal length |
|---|---|---|
| 1 | 1 | −82.11 |
| 2 | 2 | 63.24 |
| 3 | 4 | 54.14 |
| 4 | 6 | −9.41 |
| 5 | 8 | −22.10 |
| 6 | 10 | 29.86 |
| 7 | 12 | 28.63 |
| 8 | 15 | −16.01 |
| 9 | 17 | 9.51 |
| 10 | 19 | 8.68 |
| 11 | 20 | −12.11 |

Numerical Example 5

Unit: mm

Data on surfaces

| Surface No. | r | d | nd | vd | |
|---|---|---|---|---|---|
| 1 | 13.359 | 0.50 | 1.92286 | 18.9 | |
| 2 | 10.149 | 2.68 | 1.78800 | 47.4 | |
| 3 | 59.994 | (variable) | | | |
| 4 | 53.592 | 0.30 | 1.77250 | 49.6 | |
| 5 | 4.719 | 2.42 | | | |
| 6 | −11.137 | 0.30 | 1.77250 | 49.6 | |
| 7 | 19.262 | 0.05 | | | |
| 8* | 9.131 | 1.26 | 1.63550 | 23.9 | L2p |
| 9* | −32.311 | (variable) | | | |
| 10* | 4.091 | 1.36 | 1.69350 | 53.2 | |
| 11 | −21.689 | 0.18 | | | |
| 12 (stop) | ∞ | 0.14 | | | |
| 13* | 12.147 | 0.31 | 1.63550 | 23.9 | L3p |
| 14* | 3.497 | (variable) | | | |
| 15 | 12.888 | 1.58 | 1.60311 | 60.6 | |
| 16 | −2000.000 | (variable) | | | |
| 17 | ∞ | 1.00 | 1.51633 | 64.1 | |
| 18 | ∞ | 2.02 | | | |
| Image plane | ∞ | | | | |

Data on aspherical surfaces

8th surface

K = −3.31479e−002 A 4 = −1.01862e−004 A 6 = 1.20706e−005 A 8 = −7.98620e−007
9th surface K = 4.32897e+000 A 4 = 6.11365e−005 A 6 = 1.21353e−005 A 8 = −1.40008e−007 A10 = −4.54412e−008 A12 = 1.35595e−009
10th surface K = −1.33060e+000 A 4 = 1.36298e−003 A 6 = −9.75800e−006 A 8 = −1.11354e−005
13th surface K = −6.67609e−003 A 4 = −7.05452e−004 A 6 = 2.25273e−004 A 8 = 1.08719e−005 A10 = 6.84642e−006 A12 = −9.44432e−007
14th surface K = −2.98010e−001 A 4 = 1.93189e−003 A 6 = 3.72628e−004 A 8 = 4.77425e−005

-continued

Unit: mm

Other data
Zoom ratio 7.74

| | Wide-angle | Intermediate | Telephoto |
|---|---|---|---|
| Focal length | 5.15 | 12.20 | 39.85 |
| F-number | 3.07 | 3.77 | 7.05 |
| Half angle of view | 32.45 | 17.46 | 5.55 |
| Image height | 3.27 | 3.84 | 3.88 |
| Total lens length | 35.21 | 36.15 | 50.00 |
| BF | 6.42 | 8.49 | 5.74 |
| d 3 | 0.35 | 4.73 | 7.67 |
| d 9 | 12.33 | 5.17 | 0.40 |
| d14 | 5.55 | 7.20 | 25.64 |
| d16 | 2.88 | 4.96 | 2.20 |

Data on zoom lens units

| Unit | Starting surface | Focal length | Lens structural length | Front principal point | Rear principal point |
|---|---|---|---|---|---|
| 1 | 1 | 22.61 | 3.18 | −0.60 | −2.30 |
| 2 | 4 | −5.88 | 4.33 | 0.28 | −3.35 |
| 3 | 10 | 9.83 | 1.99 | −1.47 | −2.40 |
| 4 | 15 | 21.24 | 1.58 | 0.01 | −0.98 |

Data on individual lens elements

| Lens element | Starting surface | Focal length |
|---|---|---|
| 1 | 1 | −49.46 |
| 2 | 2 | 15.14 |
| 3 | 4 | −6.72 |
| 4 | 6 | −9.10 |
| 5 | 8 | 11.34 |
| 6 | 10 | 5.07 |
| 7 | 13 | −7.84 |
| 8 | 15 | 21.24 |

Numerical Example 6

Unit: mm

Data on surfaces

| Surface No. | r | d | nd | vd | |
|---|---|---|---|---|---|
| 1 | 35.064 | 0.78 | 1.84666 | 23.9 | |
| 2 | 23.171 | 3.20 | 1.49700 | 81.5 | |
| 3 | −185.480 | 0.13 | | | |
| 4 | 32.338 | 2.02 | 1.71300 | 53.9 | |
| 5 | 93.649 | (variable) | | | |
| 6 | −143.439 | 0.42 | 1.80400 | 46.6 | |
| 7 | 5.512 | 2.88 | | | |
| 8 | −24.674 | 0.40 | 1.72916 | 54.7 | |
| 9 | 10.754 | 0.10 | | | |
| 10* | 9.284 | 2.05 | 1.63550 | 23.9 | L2p |
| 11* | −41.336 | (variable) | | | |
| 12* | 6.274 | 1.47 | 1.61405 | 55.0 | |
| 13* | 38.359 | 0.73 | | | |
| 14 (stop) | ∞ | 0.72 | | | |
| 15 | 6.383 | 0.50 | 1.63550 | 23.9 | L3p |
| 16 | 3.896 | 0.73 | | | |
| 17* | 7.827 | 1.22 | 1.49700 | 81.5 | |
| 18* | −95.885 | 0.20 | | | |
| 19 | ∞ | (variable) | | | |
| 20 | 113.860 | 0.40 | 1.88300 | 40.8 | |
| 21 | 18.066 | (variable) | | | |
| 22 | 14.478 | 2.54 | 1.77250 | 49.6 | |
| 23 | −39.691 | 0.50 | 1.92286 | 18.9 | |
| 24 | −165.955 | (variable) | | | |
| 25 | ∞ | 1.00 | 1.51633 | 64.1 | |

-continued

Unit: mm

| | | |
|---|---|---|
| 26 | ∞ | 1.20 |
| Image plane | ∞ | |

Data on aspherical surfaces

10th surface

K = 4.35075e−001 A 4 = −2.37954e−004 A 6 = −5.85961e−006 A 8 = −1.90896e−007 A10 = 1.43676e−008

11th surface

K = −3.14496e+001 A 4 = −3.74365e−004 A 6 = −9.84448e−006 A 8 = 2.76983e−007 A10 = −1.49358e−009

12th surface

K = −1.01700e+000 A 4 = −4.14614e−004 A 6 = −1.54346e−005 A 8 = −1.09721e−006 A10 = 1.05705e−007

13th surface

K = −2.84295e+001 A 4 = −6.91609e−004 A 6 = −2.55995e−005 A 8 = 1.85760e−006 A10 = 4.19133e−008

17th surface

K = 1.36129e−001 A 4 = 1.73512e−003 A 6 = −2.95783e−005 A 8 = 2.30519e−005 A10 = 4.91735e−007

18th surface

K = −3.02608e+003 A 4 = 1.05336e−003 A 6 = 1.98544e−005 A 8 = 1.00614e−005 A10 = 7.68646e−007

Other data
Zoom ratio 19.91

| | Wide-angle | Intermediate | Telephoto |
|---|---|---|---|
| Focal length | 4.53 | 17.67 | 90.10 |
| F-number | 3.10 | 4.96 | 7.46 |
| Half angle of view | 36.36 | 12.37 | 2.46 |
| Image height | 3.33 | 3.88 | 3.88 |
| Total lens length | 50.74 | 63.10 | 77.35 |
| BF | 9.04 | 12.48 | 6.27 |
| d 5 | 0.58 | 12.23 | 24.21 |
| d11 | 16.89 | 5.54 | 0.10 |
| d19 | 1.61 | 6.07 | 10.86 |
| d21 | 2.14 | 6.31 | 15.43 |
| d24 | 6.33 | 9.76 | 3.56 |

Data on zoom lens units

| Unit | Starting surface | Focal length | Lens structural length | Front principal point | Rear principal point |
|---|---|---|---|---|---|
| 1 | 1 | 38.33 | 6.13 | 1.19 | −2.70 |
| 2 | 6 | −6.09 | 5.85 | 0.25 | −4.58 |
| 3 | 12 | 11.16 | 5.57 | 0.45 | −4.22 |
| 4 | 20 | −24.37 | 0.40 | 0.25 | 0.04 |
| 5 | 22 | 18.21 | 3.04 | 0.07 | −1.63 |

Data on individual lens elements

| Lens element | Starting surface | Focal length |
|---|---|---|
| 1 | 1 | −83.19 |
| 2 | 2 | 41.66 |
| 3 | 4 | 68.34 |
| 4 | 6 | −6.59 |
| 5 | 8 | −10.22 |
| 6 | 10 | 12.12 |
| 7 | 12 | 12.01 |
| 8 | 15 | −17.07 |
| 9 | 17 | 14.62 |
| 10 | 20 | −24.37 |
| 11 | 22 | 14.02 |
| 12 | 23 | −56.64 |

Numerical Example 7

Unit: mm

Data on surfaces

| Surface No. | r | d | nd | vd | |
|---|---|---|---|---|---|
| 1 | 63.324 | 0.65 | 1.85146 | 24.0 | |
| 2 | 37.266 | 3.00 | 1.49700 | 81.5 | |
| 3 | −1428.064 | 0.20 | | | |
| 4 | 33.602 | 2.23 | 1.69680 | 55.5 | |
| 5 | 107.379 | (variable) | | | |
| 6 | 55.404 | 0.65 | 1.69680 | 55.5 | |
| 7 | 6.552 | 4.20 | | | |
| 8 | −22.845 | 0.50 | 1.48749 | 70.2 | |
| 9 | 8.323 | 0.20 | | | |
| 10* | 7.382 | 2.10 | 1.63550 | 23.9 | L2p |
| 11* | 19.349 | (variable) | | | |
| 12* | 5.008 | 1.50 | 1.58313 | 59.4 | |
| 13* | 11.173 | 0.58 | | | |
| 14 (stop) | ∞ | 0.00 | | | |
| 15* | 13.416 | 0.70 | 1.60737 | 27.0 | L3p |
| 16* | 5.444 | 0.60 | | | |
| 17 | 7.508 | 1.40 | 1.51823 | 58.9 | |
| 18 | 31.719 | 0.00 | | | |
| 19 | ∞ | (variable) | | | |
| 20 | −607.242 | 1.00 | 1.60000 | 60.0 | |
| 21 | −44.511 | (variable) | | | |
| 22 | 20.120 | 1.85 | 1.77250 | 49.6 | |
| 23 | −19.678 | 0.50 | 1.80518 | 25.4 | |
| 24 | 742.217 | (variable) | | | |
| 25 | ∞ | 1.00 | 1.51633 | 64.1 | |
| 26 | ∞ | 0.50 | | | |
| Image plane | ∞ | | | | |

Data on aspherical surfaces

10th surface

K = −1.44460e−001 A 4 = −4.30587e−004 A 6 = 1.02379e−005 A 8 = −4.16173e−007 A10 = 1.81788e−008 A12 = −4.33929e−010

11th surface

K = −1.10632e+001 A 4 = −1.73479e−004 A 6 = 1.47628e−006 A 8 = 2.48821e−007 A10 = −5.79043e−009 A12 = −1.18708e−010

12th surface

K = 4.35934e−001 A 4 = −9.99054e−004 A 6 = −9.95838e−006 A 8 = −2.84094e−007 A10 = −3.38893e−007 A12 = 5.29450e−008

13th surface

K = −2.33257e+001 A 4 = 2.61657e−004 A 6 = 2.64226e−005 A 8 = 9.10594e−006 A10 = −1.45053e−006 A12 = 1.75141e−007

15th surface

K = 1.46252e+000 A 4 = 5.89980e−004 A 6 = 9.99875e−005 A 8 = −1.41772e−005 A10 = 4.51780e−007 A12 = 4.21404e−008

16th surface

K = 6.96492e−001 A 4 = 2.53457e−003 A 6 = −6.06921e−005 A 8 = −1.90801e−006 A10 = −1.13544e−006 A12 = 8.28676e−008

Other data
Zoom ratio 20.82

| | Wide-angle | Intermediate | Telephoto |
|---|---|---|---|
| Focal length | 5.04 | 29.32 | 104.99 |
| F-number | 3.22 | 4.36 | 6.36 |
| Half angle of view | 34.06 | 7.53 | 2.11 |
| Image height | 3.41 | 3.88 | 3.88 |
| Total lens length | 58.25 | 75.07 | 93.97 |
| BF | 9.31 | 19.28 | 5.96 |
| d 5 | 0.24 | 24.62 | 36.21 |
| d11 | 19.95 | 2.59 | 0.10 |
| d19 | 5.63 | 4.50 | 1.13 |

-continued

Unit: mm

| | | | |
|---|---|---|---|
| d21 | 2.12 | 3.08 | 29.58 |
| d24 | 7.29 | 17.26 | 3.94 |

Data on zoom lens units

| Unit | Starting surface | Focal length | Lens structural length | Front principal point | Rear principal point |
|---|---|---|---|---|---|
| 1 | 1 | 53.80 | 6.08 | 1.39 | −2.48 |
| 2 | 6 | −7.59 | 7.65 | 1.49 | −4.34 |
| 3 | 12 | 16.20 | 4.78 | −1.18 | −4.50 |
| 4 | 20 | 80.00 | 1.00 | 0.67 | 0.05 |
| 5 | 22 | 27.96 | 2.35 | −0.09 | −1.41 |

Data on individual lens elements

| Lens element | Starting surface | Focal length |
|---|---|---|
| 1 | 1 | −107.60 |
| 2 | 2 | 73.13 |
| 3 | 4 | 69.33 |
| 4 | 6 | −10.72 |
| 5 | 8 | −12.45 |
| 6 | 10 | 17.58 |
| 7 | 12 | 14.28 |
| 8 | 15 | −15.60 |
| 9 | 17 | 18.61 |
| 10 | 20 | 80.00 |
| 11 | 22 | 13.14 |
| 12 | 23 | −23.80 |

TABLE 1

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| $|f3p/ft|$ | 0.18 | 0.18 | 0.11 | 0.12 | 0.20 | 0.19 | 0.15 |
| $f2p/f3p$ | −1.14 | −0.74 | −2.10 | −0.99 | −1.45 | −0.71 | −1.13 |
| $ft/f2$ | −10.3 | −10.1 | −10.5 | −10.2 | −6.8 | −14.8 | −13.8 |
| $ft/f3$ | 5.6 | 5.5 | 5.7 | 5.5 | 4.1 | 8.1 | 6.5 |
| Nd2p | 1.63550 | 1.53110 | 1.63550 | 1.53110 | 1.63550 | 1.63550 | 1.63550 |
| vd2p | 23.9 | 55.9 | 23.9 | 55.9 | 23.9 | 23.9 | 23.9 |
| Nd3p | 1.60737 | 1.53110 | 1.60737 | 1.53110 | 1.63550 | 1.63550 | 1.60737 |
| vd3p | 27.0 | 55.9 | 27.0 | 55.9 | 23.9 | 23.9 | 27.0 |
| τ (L2p) | $-10.0 \times 10^{-6}$ | $-11.5 \times 10^{-6}$ | $-12.4 \times 10^{-6}$ | $-11.5 \times 10^{-6}$ | $-10.0 \times 10^{-6}$ | $-10.0 \times 10^{-6}$ | $-10.0 \times 10^{-6}$ |
| τ (L3p) | $-12.4 \times 10^{-6}$ | $-11.5 \times 10^{-6}$ | $-12.4 \times 10^{-6}$ | $-11.5 \times 10^{-6}$ | $-10.0 \times 10^{-6}$ | $-10.0 \times 10^{-6}$ | $-12.4 \times 10^{-6}$ |
| α (L2p) | $6.6 \times 10^{-5}$ | $6.0 \times 10^{-5}$ | $7.2 \times 10^{-5}$ | $6.0 \times 10^{-5}$ | $6.6 \times 10^{-5}$ | $6.6 \times 10^{-5}$ | $7.2 \times 10^{-5}$ |
| α (L3p) | $7.2 \times 10^{-5}$ | $6.0 \times 10^{-5}$ | $7.2 \times 10^{-5}$ | $6.0 \times 10^{-5}$ | $6.6 \times 10^{-5}$ | $6.6 \times 10^{-5}$ | $7.2 \times 10^{-5}$ |

Referring now to FIG. 15, a digital still camera as another embodiment will be described in which the zoom lens according to any of the first to seventh embodiments serves as an imaging optical system. The digital still camera illustrated in FIG. 15 includes a camera body 20, an imaging optical system 21 corresponding to the zoom lens according to any of the first to seventh embodiments, a solid-state image pickup device (photoelectric conversion device) 22 such as a CCD sensor or a CMOS sensor provided in the camera body 20 and that receives an optical image of an object formed by the imaging optical system 21, a memory 23 that stores information corresponding to the optical image of the object obtained through photoelectric conversion performed by the solid-state image pickup device 22, and a finder 24 that includes a liquid-crystal display panel or the like and through which the image of the object formed on the solid-state image pickup device 22 is observed. If the zoom lens according to any of the first to seventh embodiments of the present invention is applied to an image pickup apparatus such as a digital still camera, an image pickup apparatus having a high zoom ratio, being of a small size in the optical-axis direction, and exhibiting high optical performance at every zooming position is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-102582, filed May 14, 2013, which is hereby incorporated by reference herein in its entirety.

What is claimed is:

1. A zoom lens comprising, in order from an object side to an image side thereof:
a first lens unit having a positive refractive power;
a second lens unit having a negative refractive power;
a third lens unit having a positive refractive power; and
a rear lens group including one or more lens units,
wherein a distance between adjacent ones of the lens units changes during zooming,
wherein the second lens unit and the third lens unit each include a resin lens element, and
wherein the following conditional expressions are satisfied:

$$0.10 < |f3p/ft| < 0.23$$

$$-2.40 < f2p/f3p < -0.34$$

where f2p denotes a focal length of the resin lens element included in the second lens unit, f3p denotes a focal length of the resin lens element included in the third lens unit, and ft denotes a focal length of the zoom lens at a telephoto end.

2. The zoom lens according to claim 1, wherein the resin lens elements each have an object-side surface and an image-side surface that are in contact with air.

3. The zoom lens according to claim 1, wherein the following conditional expression is satisfied:

$$-30.0 < ft/f2 < -5.0$$

where f2 denotes a focal length of the second lens unit.

4. The zoom lens according to claim 1, wherein the following conditional expression is satisfied:

$$3.0 < ft/f3 < 15.0$$

where f3 denotes a focal length of the third lens unit.

5. The zoom lens according to claim 1, wherein the following conditional expressions are satisfied:

$$1.45 < Nd2p < 2.59 \times 10^{-4} \times vd2p^2 - 2.64 \times 10^{-2} \times vd2p + 2.213$$

$$vd2p < 60.0$$

$$1.45 < Nd3p < 2.59 \times 10^{-4} \times vd3p^2 - 2.64 \times 10^{-2} \times vd3p + 2.213$$

$$vd3p < 60.0$$

where Nd2p and vd2p denote a refractive index and an Abbe number, respectively, of the resin lens element included in the second lens unit with respect to d-line, and Nd3p and vd3p denote a refractive index and an Abbe number, respectively, of the resin lens element included in the third lens unit with respect to d-line.

6. The zoom lens according to claim 1, wherein the following conditional expression is satisfied:

$$-5.0 \times 10^{-4}/°C. < \tau < -5.0 \times 10^{-6}/°C.$$

where τ denotes a temperature coefficient for each of refractive indices of the resin lens elements included in the second and third lens units that are at 20° C.

7. The zoom lens according to claim 1, wherein the following conditional expression is satisfied:

$$1.0 \times 10^{-5}/°C. < \alpha < 10.0 \times 10^{-5}/°C.$$

where α denotes a linear expansion coefficient for each of the resin lens elements included in the second and third lens units.

8. The zoom lens according to claim 1, wherein the resin lens element included in the second lens unit has a positive refractive power, and the resin lens element included in the third lens unit has a negative refractive power.

9. The zoom lens according to claim 1, wherein the resin lens element included in the second lens unit has a negative refractive power, and the resin lens element included in the third lens unit has a positive refractive power.

10. The zoom lens according to claim 8, wherein the following conditional expression is satisfied:

$$15.0 < vd2p < 35.0$$

where vd2p denotes an Abbe number of the resin lens element included in the second lens unit with respect to d-line.

11. The zoom lens according to claim 9, wherein the following conditional expression is satisfied:

$$15.0 < vd3p < 35.0$$

where vd3p denotes an Abbe number of the resin lens element included in the third lens unit with respect to d-line.

12. The zoom lens according to claim 1, wherein the rear lens group consists of a fourth lens unit having a positive refractive power.

13. The zoom lens according to claim 1, wherein the rear lens group consists of a fourth lens unit having a negative refractive power and a fifth lens unit having a positive refractive power.

14. The zoom lens according to claim 1, wherein the rear lens group consists of a fourth lens unit having a positive refractive power, and a fifth lens unit having a positive refractive power.

15. The zoom lens according to claim 1, wherein an image is to be formed on a solid-state image pickup device.

16. An image pickup apparatus comprising:
a zoom lens; and
an image pickup device that receives an optical image formed by the zoom lens,
wherein the zoom lens includes, in order from an object side to an image side thereof,
a first lens unit having a positive refractive power;
a second lens unit having a negative refractive power;
a third lens unit having a positive refractive power; and
a rear lens group including one or more lens units,
wherein a distance between adjacent ones of the lens units changes during zooming,
wherein the second lens unit and the third lens unit each include a resin lens element, and
wherein the following conditional expressions are satisfied:

$$0.10 < |f3p/ft| < 0.23$$

$$-2.40 < f2p/f3p < -0.34$$

where f2p denotes a focal length of the resin lens element included in the second lens unit, f3p denotes a focal length of the resin lens element included in the third lens unit, and ft denotes a focal length of the zoom lens at a telephoto end.

* * * * *